US012289629B2

(12) United States Patent
Nam et al.

(10) Patent No.: US 12,289,629 B2
(45) Date of Patent: Apr. 29, 2025

(54) CHANNEL STATE INFORMATION ENHANCEMENT WITH CROSS-LINK INTERFERENCE MEASUREMENT

(71) Applicant: QUALCOMM Incorporated, San Diego, CA (US)

(72) Inventors: Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 17/516,158

(22) Filed: Nov. 1, 2021

(65) Prior Publication Data

US 2023/0136620 A1 May 4, 2023

(51) Int. Cl.

*H04W 24/10* (2009.01)
*H04B 7/06* (2006.01)
*H04W 24/08* (2009.01)
*H04W 72/20* (2023.01)

(52) U.S. Cl.

CPC .......... *H04W 24/10* (2013.01); *H04B 7/0626* (2013.01); *H04W 24/08* (2013.01); *H04W 72/20* (2023.01)

(58) Field of Classification Search

CPC ......... H04W 92/18; H04W 4/70; H04W 4/80; H04W 8/005; H04W 8/24; H04W 76/14; H04W 88/02; H04W 88/06; G06F 3/1204; G06F 3/1236; G06F 3/1238; G06F 3/1273; G06F 3/1292; H04M 2250/22; H04M 1/72412; H04M 1/72427; H04M 1/7243; H04M 1/72469

See application file for complete search history.

(56) References Cited

U.S. PATENT DOCUMENTS

2020/0266908 A1* 8/2020 Qian .................... H04L 5/0062
2021/0203388 A1* 7/2021 Tomeba ............... H04B 7/0617
2024/0015537 A1* 1/2024 Zhang .................. H04L 5/0051

FOREIGN PATENT DOCUMENTS

WO WO-2018228421 A1 * 12/2018 ........... H04B 17/336

* cited by examiner

*Primary Examiner* — Ayanah S George
(74) *Attorney, Agent, or Firm* — Holland & Hart LLP

(57) ABSTRACT

Methods, systems, and devices for wireless communications are described. Generally, the described techniques provide for the allocation of a cross-link interference measurement resource (CL-IMR). A base station in communication with an “aggressor” user equipment (UE) and a “victim” UE may indicate a configuration for the CL-IMR to the victim UE, for example in one or both of the channel state information (CSI) report settings or CSI resource settings indicated in control signaling. The base station may also indicate in downlink control information, to the aggressor UE, to transmit one or more reference signals in the same time-frequency resources as the CL-IMR. The CL-IMR may include one or more CSI reference signal resources which may be one-to-one mapped with channel measurement resources. A victim UE may consider the CLI measurement through the CL-IMR when the victim UE calculates and reports CSI to the base station.

30 Claims, 17 Drawing Sheets

CHANNEL STATE INFORMATION ENHANCEMENT WITH CROSS-LINK INTERFERENCE MEASUREMENT

FIELD OF TECHNOLOGY

The following relates to wireless communications, including channel state information enhancement with cross-link interference measurement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support channel state information enhancement with cross-link interference measurement. Generally, the described techniques provide for the allocation of a cross-link interference measurement resource (CL-IMR). In some examples, the CL-IMR resource may support cross-link interference (CLI) measurements using layer 1 procedures. A base station in communication with an "aggressor" user equipment (UE) and a "victim" UE may indicate a configuration for the CL-IMR to the victim UE, for example in one or both of the channel state information (CSI) report settings or CSI resource settings indicated in control signaling. The base station may also indicate, for example in downlink control information (DCI), to the aggressor UE, to transmit one or more reference signals in the same time-frequency resources as the CL-IMR. In some cases, the base station may schedule an aperiodic cross-link interference measurement in group-common DCI (e.g., joint triggering of the cross-link measurement). For example, the base station may transmit a common DCI indicating a timing for the aggressor UE to transmit one or more reference signals and the timing for the victim UE to perform the cross-link interference measurement using the configured CL-IMR. In some cases, the base station may provide the indications of the scheduling of an aperiodic cross-link interference measurement to the victim UE and the aggressor UE in separate DCI messages. The CL-IMR may be aperiodic, semi-persistent, or periodic. The CL-IMR may include one or more CSI reference signal resources which may be one-to-one mapped with channel measurement resources. In some examples, a victim UE may consider the CLI measurement through the CL-IMR when the victim UE calculates and reports channel state information to the base station.

A method for wireless communications at a first UE is described. The method may include receiving, from a base station, control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting, performing the cross-link interference measurement of the communications from the second UE based on the configuration, and transmitting, to the base station, a report indicating the cross-link interference measurement.

An apparatus for wireless communications at a first UE is described. The apparatus may include a processor, memory coupled with the processor, and instructions stored in the memory. The instructions may be executable by the processor to cause the apparatus to receive, from a base station, control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting, perform the cross-link interference measurement of the communications from the second UE based on the configuration, and transmit, to the base station, a report indicating the cross-link interference measurement.

Another apparatus for wireless communications at a first UE is described. The apparatus may include means for receiving, from a base station, control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting, means for performing the cross-link interference measurement of the communications from the second UE based on the configuration, and means for transmitting, to the base station, a report indicating the cross-link interference measurement.

A non-transitory computer-readable medium storing code for wireless communications at a first UE is described. The code may include instructions executable by a processor to receive, from a base station, control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting, perform the cross-link interference measurement of the communications from the second UE based on the configuration, and transmit, to the base station, a report indicating the cross-link interference measurement.

In some examples of the method, apparatuses, and non-transitory computer-readable medium described herein, performing the cross-link interference measurement may include operations, features, means, or instructions for receiving, from the second UE, a reference signal during the cross-link interference measurement resource and measuring a signal strength of the reference signal.

In some examples of the method, apparatuses, and non-transitory computer-readable medium described herein, receiving the control signaling may include operations, features, means, or instructions for receiving an indication that the configuration for the cross-link interference measurement resource includes a set of multiple time-frequency resources, where performing the cross-link interference measurement of the second UE includes and measuring a set of multiple beams transmitted by the second UE, where each beam of the set of multiple beams may be measured via a respective time-frequency resource of the set of multiple time-frequency resources.

In some examples of the method, apparatuses, and non-transitory computer-readable medium described herein, receiving the control signaling may include operations, features, means, or instructions for receiving an indication that the configuration for the cross-link interference measurement resource includes a set of multiple time-frequency resources, where performing the cross-link interference measurement of the second UE includes and measuring a set of multiple beams transmitted by a set of multiple UEs, where the set of multiple UEs includes the second UE, and where each beam of the set of multiple beams may be measured via a respective time-frequency resource of the set of multiple time-frequency resources.

In some examples of the method, apparatuses, and non-transitory computer-readable medium described herein, receiving the control signaling may include operations, features, means, or instructions for receiving an indication of a set of multiple channel state information resources, where the configuration identifies the cross-link interference measurement resource from the set of multiple channel state information resources.

In some examples of the method, apparatuses, and non-transitory computer-readable medium described herein, receiving the control signaling may include operations, features, means, or instructions for receiving an indication that the configuration for the cross-link interference measurement resource includes a set of multiple time-frequency resources, where each time-frequency resource of the set of multiple time-frequency resources may be one-to-one mapped with a respective channel measurement resource of a set of multiple channel measurement resources.

In some examples of the method, apparatuses, and non-transitory computer-readable medium described herein, each time-frequency resource of the set of multiple time-frequency resources may be quasi co-located with the respective one-to-one mapped channel measurement resource of the set of multiple channel measurement resources.

Some examples of the method, apparatuses, and non-transitory computer-readable medium described herein may further include operations, features, means, or instructions for calculating a channel state information of a link between the first UE and the base station based on the cross-link interference measurement of the second UE, where transmitting the report indicating the cross-link interference measurement includes transmitting the calculated channel state information.

In some examples of the method, apparatuses, and non-transitory computer-readable medium described herein, calculating the channel state information may include operations, features, means, or instructions for calculating a layer one reference signal received power, a layer one signal to interference and noise ratio, a precoding matrix index, a rank indicator, a channel quality indicator, a layer one received signal strength indicator, or a combination thereof.

Some examples of the method, apparatuses, and non-transitory computer-readable medium described herein may further include operations, features, means, or instructions for receiving, from the base station, a downlink control information message indicating an aperiodic cross-link interference measurement and reporting using the configuration for the cross-link interference measurement resource.

A method for wireless communications at a base station is described. The method may include transmitting, to a first UE, first control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting, transmitting, to the second UE, second control signaling indicating a timing for a transmission of a reference signal by the second UE, and receiving, from the first UE, a report indicating the cross-link interference measurement of the second UE.

An apparatus for wireless communications at a base station is described. The apparatus may include a processor, memory coupled with the processor, and instructions stored in the memory. The instructions may be executable by the processor to cause the apparatus to transmit, to a first UE, first control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting, transmit, to the second UE, second control signaling indicating a timing for a transmission of a reference signal by the second UE, and receive, from the first UE, a report indicating the cross-link interference measurement of the second UE.

Another apparatus for wireless communications at a base station is described. The apparatus may include means for transmitting, to a first UE, first control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting, means for transmitting, to the second UE, second control signaling indicating a timing for a transmission of a reference signal by the second UE, and means for receiving, from the first UE, a report indicating the cross-link interference measurement of the second UE.

A non-transitory computer-readable medium storing code for wireless communications at a base station is described. The code may include instructions executable by a processor to transmit, to a first UE, first control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting, transmit, to the second UE, second control signaling indicating a timing for a transmission of a reference signal by the second UE, and receive, from the first UE, a report indicating the cross-link interference measurement of the second UE.

Some examples of the method, apparatuses, and non-transitory computer-readable medium described herein may further include operations, features, means, or instructions for transmitting, to the first UE and the second UE, a common downlink control information message to the first UE and the second UE indicating an aperiodic cross-link interference measurement and reporting using the configuration for the cross-link interference measurement resource, where the common downlink control information message includes the second control signaling.

Some examples of the method, apparatuses, and non-transitory computer-readable medium described herein may further include operations, features, means, or instructions for transmitting, to the first UE, a downlink control information message indicating an aperiodic cross-link interference measurement and reporting using the configuration for the cross-link interference measurement resource.

In some examples of the method, apparatuses, and non-transitory computer-readable medium described herein, transmitting the first control signaling may include operations, features, means, or instructions for transmitting a first indication that the configuration for the cross-link interference measurement resource includes a set of multiple time-frequency resources, and where transmitting the second control signaling includes and transmitting a second indication of a scheduling of a set of multiple beam transmissions by the second UE, where each beam transmission may be associated with a respective time-frequency resource of the set of multiple time-frequency resources.

In some examples of the method, apparatuses, and non-transitory computer-readable medium described herein, transmitting the first control signaling may include operations, features, means, or instructions for transmitting a first indication that the configuration for the cross-link interference measurement resource includes a set of multiple time-frequency resources, and where transmitting the second control signaling includes and transmitting, to a set of multiple UEs, a second indication of a scheduling of a set of multiple beam transmissions by the set of multiple UEs, where the set of multiple UEs includes the second UE, and where each beam transmission may be associated with a respective time-frequency resource of the set of multiple time-frequency resources.

In some examples of the method, apparatuses, and non-transitory computer-readable medium described herein, transmitting the first control signaling may include operations, features, means, or instructions for transmitting an indication of a set of multiple channel state information resources, where the configuration identifies the cross-link interference measurement resource from the set of multiple channel state information resources.

In some examples of the method, apparatuses, and non-transitory computer-readable medium described herein, transmitting the first control signaling may include operations, features, means, or instructions for transmitting an indication that the configuration for the cross-link interference measurement resource includes a set of multiple time-frequency resources, where each time-frequency resource of the set of multiple time-frequency resources may be one-to-one mapped with a respective channel measurement resource of a set of multiple channel measurement resources.

In some examples of the method, apparatuses, and non-transitory computer-readable medium described herein, each time-frequency resource of the set of multiple time-frequency resources may be quasi co-located with the respective one-to-one mapped channel measurement resource of the set of multiple channel measurement resources.

In some examples of the method, apparatuses, and non-transitory computer-readable medium described herein, receiving the report indicating the cross-link interference measurement may include operations, features, means, or instructions for receiving an indication of a channel state information of a link between the first UE and the base station.

DETAILED DESCRIPTION

Figure 1:
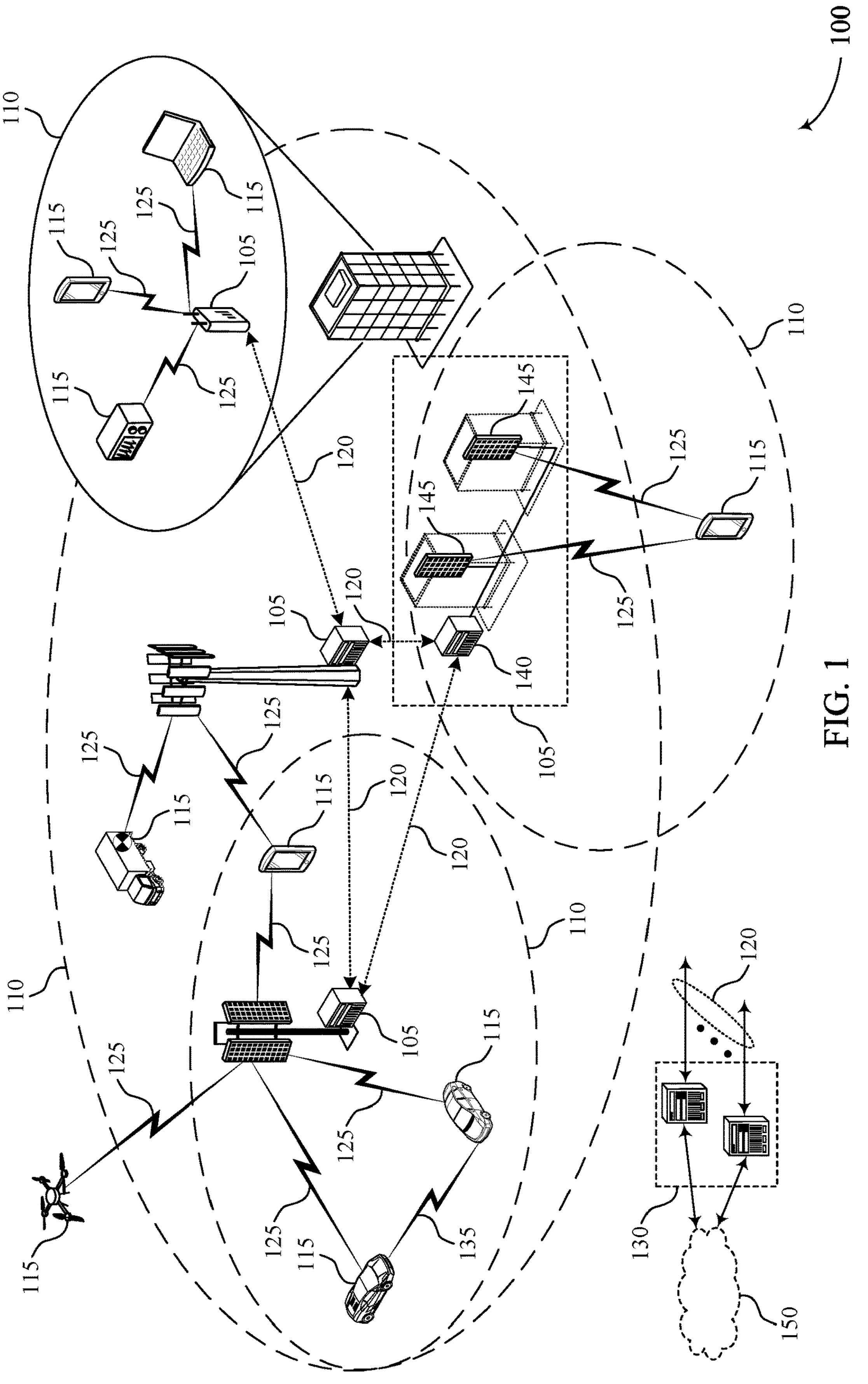
FIG. 1 illustrates an example of a wireless communications system that supports channel state information enhancement with cross-link interference measurement in accordance with aspects of the present disclosure.

A user equipment (UE) may experience cross-link interference (CLI) attributable to signals transmitted by other UEs. For example, a "victim" UE may experience CLI from signals transmitted by an "aggressor" UE in cases where downlink resources of the victim UE overlap with uplink resources of the aggressor UE, thereby resulting in CLI. In some wireless communications systems, UEs may be configured to perform CLI measurements on signals received from other UEs, and report measured CLI to the network so that the network may adjust resources allocated to the respective UEs to reduce CLI. In some cases, base stations may coordinate the time and frequency resources of the aggressor UE's sounding reference signal (SRS) transmissions with the victim UE's CLI measurement resources in order to measure the CLI. Legacy CLI measurement and reporting may be based on layer-3 procedures. In some cases, however, the aggressor UE and victim UE may be in communication with the same cell (e.g., via a full-duplex base station), which may result in more dynamic cross-link interference. Current methods for measuring CLI may be unable to measure and respond to the dynamic CLI caused by an aggressor UE in communication with the same base station as the victim UE.

Aspects of the present disclosure support the allocation of a cross-link interference measurement resource (CL-IMR). In some examples, the CL-IMR resource may support CLI measurements using layer 1 procedures. A base station in communication with an aggressor UE and a victim UE may indicate a configuration for the CL-IMR to the victim UE, for example in one or both of the channel state information (CSI) report settings or CSI resource settings indicated in control signaling such as a radio resource control (RRC) message. The base station may also indicate, for example in another RRC message, to the aggressor UE, to transmit one or more reference signals (e.g., SRS(s)) in the same time-frequency resources as the CL-IMR. In some cases, the base station may schedule an aperiodic CLI measurement and reporting in group-common downlink control information (DCI) (e.g., joint triggering of the cross-link measurement). For example, the base station may transmit a common DCI indicating a timing and a resource for the aggressor UE to transmit one or more reference signals and the timing and the resource for the victim UE to perform the CLI measurement using the configured CL-IMR. In some cases, the base station may provide the indications of the scheduling of an aperiodic CLI measurement and reporting to the victim UE and a transmission of one or more reference signals to the aggressor UE in separate DCI (e.g., separate triggering). The CL-IMR may be aperiodic, semi-persistent, or periodic. The CL-IMR may include one or more resources which may be one-to-one mapped with channel measurement resources (CMRs). In some examples, a victim UE may consider the CLI measurement through the CL-IMR when the victim UE calculates and reports CSI to the base station (e.g., the CLI measurement may be taken into account when calculating a layer one reference signal received power, a layer one signal to interference and noise ratio, a precoding matrix index, a rank indicator, a channel quality indicator, or a layer one received signal strength indicator).

Aspects of the disclosure are initially described in the context of wireless communications systems. Aspects of the disclosure are further illustrated by and described with reference to wireless communications systems, resource configurations, and process flows. Aspects of the disclosure are further illustrated by and described with reference to apparatus diagrams, system diagrams, and flowcharts that relate to channel state information enhancement with cross-link interference measurement.

FIG. 1 illustrates an example of a wireless communications system 100 that supports channel state information enhancement with cross-link interference measurement in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may experience CLI attributable to signals transmitted by other UEs 115. For example, a victim UE 115 may experience CLI from signals transmitted by an aggressor UE 115 in cases where downlink resources of the victim UE 115 overlap with uplink resources of the aggressor UE 115, thereby resulting in CLI. A base station 105 in communication with an aggressor UE 115 and a victim UE 115 may indicate a configuration for the CL-IMR to the victim UE 115, for example in one or both of the CSI report settings or CSI resource settings indicated in control signaling such as an RRC message. The base station 105 may also indicate (e.g., in an RRC message), to the aggressor UE 115, to transmit one or more reference signals (e.g., SRS(s)) in the same time-frequency resources as the CL-IMR. In some cases, the base station 105 may schedule an aperiodic CLI measurement and reporting in group-common DCI (e.g., joint triggering of the cross-link measurement). For example, the base station 105 may transmit a common DCI indicating a timing and a resource for the aggressor UE 115 to transmit one or more reference signals and the timing and the resource for the victim UE 115 to perform the CLI measurement using the configured CL-IMR. In some cases, the base station 105 may provide the indications of the scheduling of an aperiodic CLI measurement and reporting to the victim UE 115 and the aggressor UE 115 in separate DCI (e.g., separate triggering). The CL-IMR may be aperiodic, semi-persistent, or periodic. The CL-IMR may include one or more resources which may be one-to-one mapped with CMRs. In some examples, a victim UE 115 may consider the CLI measurement through the CL-IMR when the victim UE 115 calculates and reports CSI to the base station 105 (e.g., the CLI measurement may be taken into account when calculating a layer one reference signal received power, a layer one signal to interference and noise ratio, a precoding matrix index, a rank indicator, a channel quality indicator, or a layer one received signal strength indicator).

Figure 2:
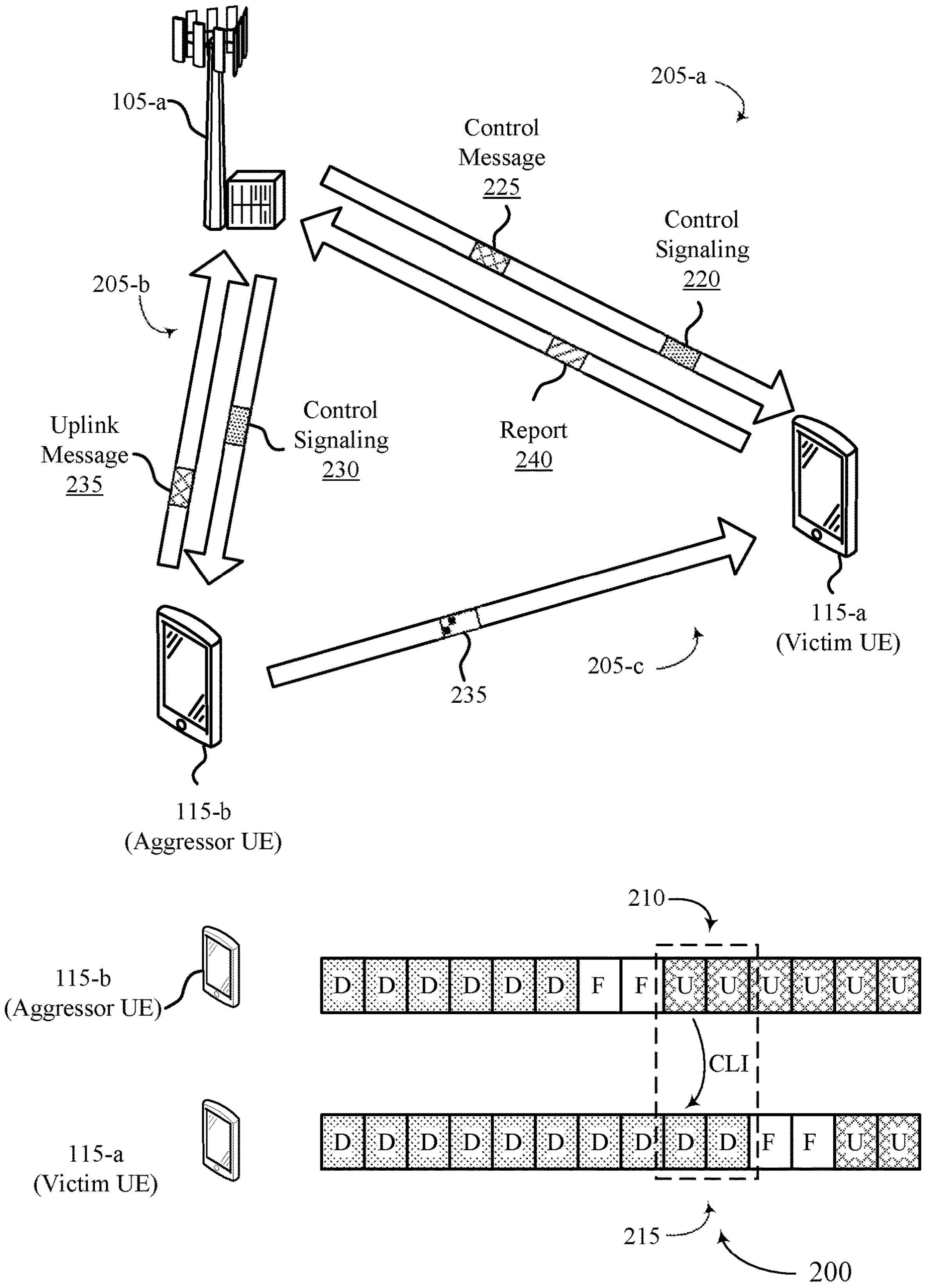
FIG. 2 illustrates an example of a wireless communications system that supports channel state information enhancement with cross-link interference measurement in accordance with aspects of the present disclosure.

FIG. 2 illustrates an example of a wireless communications system 200 that supports channel state information enhancement with cross-link interference measurement in accordance with aspects of the present disclosure. In some examples, wireless communications system 200 may implement, or may be implemented by, aspects of wireless communications system 100. The wireless communications system 200 may include a first UE 115-*a*, a second UE 115-*b*, and a base station 105-*a*, which may be examples of UEs 115 and base stations 105, as described herein.

The first UE 115-*a* and the second UE 115-*b* may communicate with the base station 105-*a* using a communication link 205-*a* and a communication link 205-*b*, respectively, which may be examples of NR or LTE links between the first UE 115-*a* and the second UE 115-*b*, respectively, and the base station 105-*a*. In some cases, the communication link 205-*a* and the communication link 205-*b* may include examples of access links (e.g., Uu links). The communication link 205-*a* and communication link 205-*b* may include bi-directional links that enable both uplink and downlink communication. For example, the first UE 115-*a* may transmit uplink signals, such as uplink control signals or uplink data signals, to the base station 105-*a* using the first communication link 205-*a* and the base station 105-*a* may transmit downlink signals, such as downlink control signals or downlink data signals, to the first UE 115-*a* using the communication link 205-*a*. By way of another example, the second UE 115-*b* may transmit uplink signals, such as uplink control signals or uplink data signals, to the base station 105-*a* using the first communication link 205-*b* and the base station 105-*a* may transmit downlink signals, such as downlink control signals or downlink data signals, to the second UE 115-*b* using the communication link 205-*b*. The first UE 115-*a* and the second UE 115-*b* may communicate with one another via a communication link 205-*c*. In some cases, the communication link 205-*c* may include an example of a link between two UEs 115 (e.g., a sidelink communication link, or PC5 link).

As described herein, a victim UE 115 (e.g., first UE 115-*a*) may experience CLI which is attributable to signals transmitted by another nearby aggressor UE 115 (e.g., second UE 115-*b*). CLI may occur when the network (e.g., base station 105-*a*) configures multiple nearby UEs 115 with different TDD uplink and downlink slot formats. In particular, when an aggressor UE 115 (e.g., second UE 115-*b*) is transmitting uplink signals 235, a nearby victim UE 115 (e.g., first UE 115-*a*) may receive the uplink signals 235 as CLI within its configured downlink symbols if uplink symbols of the aggressor UE 115-*b* collide with (e.g., overlap with) at least one downlink symbol of the victim UE 115-*a*. The uplink signals transmitted by the aggressor UE 115-*b* may or may not be intended for the victim UE 115-*a*, such that the victim UE 115-*a* inadvertently "intercepts" the uplink signals 235 intended for another wireless device (e.g., base station 105-*a*).

For example, as shown in FIG. 2, the first UE 115-*a* (e.g., victim UE 115-*a*) may experience CLI from signals 235 transmitted by the second UE 115-*b* (e.g., aggressor UE 115-*b*) in cases where downlink resources 215 of the first UE 115-*a* overlap with uplink resources 210 of the second UE 115-*b* (e.g., where an uplink symbol from the aggressor UE 115-*b* collides with a downlink symbol of the victim UE 115-*a*). In such cases, uplink transmissions 235 from second UE 115-*b* over the uplink resources 210 may collide with, or otherwise interrupt or interfere with, downlink transmissions received by the first UE 115-*a* within the downlink resources 215, thereby resulting in CLI. CLI may occur between UEs 115 within the same cell (i.e., intra-cell) and/or between UEs 115 within different cells (i.e., inter cell). Inter cell CLI may be caused by semi-static time division duplex uplink and downlink configurations in the different cells. Intra-cell CLI may be caused by specific dynamic time division duplex uplink and downlink configurations inside the same cell.

Some wireless communications systems (e.g., wireless communications system 200) include CMRs to measure CSI, including defined signaling and procedures for the victim UE 115-*a* to measure CLI which is attributable to signals transmitted by the aggressor UE 115-*b*. In this regard, the victim UE 115-*a* may be configured to perform CLI measurements attributable to signals received from other UEs 115 (e.g., aggressor UE 115-*b*).

For example. some UEs (e.g., UE 115-*a*) may include a framework including a linkage to one resource setting (e.g., CMR), a linkage to two resource settings (e.g., CMR and CSI interference measurement (CSI-IM) or non-zero power interference measurement resource (NZP-IMR)), or a linkage to three resource settings (e.g., CMR, CSI-IM and NZP-IMR). In some cases, each resource setting may be associated with one active resource set, and each resource set may include one or more resources (e.g., N resources). The UE 115-*a* may evaluate CSI corresponding to the N NZP-CMR resources and select one CMR resource out of the N resources, and the communication resource index corresponding to the selected CMR resource may be reported back to the base station 105-*a* as part of CSI feedback (e.g., the base station 105-*a* may use the report to associate the reported CSI with a given NZP-CMR resource). Accordingly, the base station 105-*a* may know which resources to use to communicate with the UE 115-*a*.

For a CSI-IM resource, there may be a one-to-one mapping between each CMR (or each CSI hypothesis or each communication resource index) and each CSI-IM resource. For example, each CSI-RS resource for channel measurement may be resource-wise associated with a CSI-IM resource by the ordering of the CSI-RS resource and CSI-IM resource in the corresponding resource sets. The number of CSI-RS resources for channel measurement may be equal to the number of CSI-IM resources. The UE 115-*a* may measure interference by measuring the energy in the CSI-IM resource (e.g., with no reference signal estimation or measurement). The CSI-IM resource configuration may include REs for the UE 115-*a* to measure interference. NZP-IMR (e.g., non-zero power (NZP) CSI-RS resources for interference measurement) may be associated with all CMRs in a resource setting, unlike CSI-IM. Each NZP CSI-RS port configured for interference measurement may correspond to an interference transmission layer. The UE 115-*a* may estimate each port of the NZP CSI-RS resource for interference measurements, and each port may correspond to one interference transmission layer. A port of NZP-IMR may be beamformed and may be used for measuring multiple user interference. The NZP-IMR and CSI-IM may be quasi co-located (Type D) with the corresponding CMR resource. CSI-IM may be used to measure interference from neighboring cells, and NZP-IMR may be used to measure interference from UEs 115 within the same cell (e.g., in multiple user scenarios).

Figure 3:
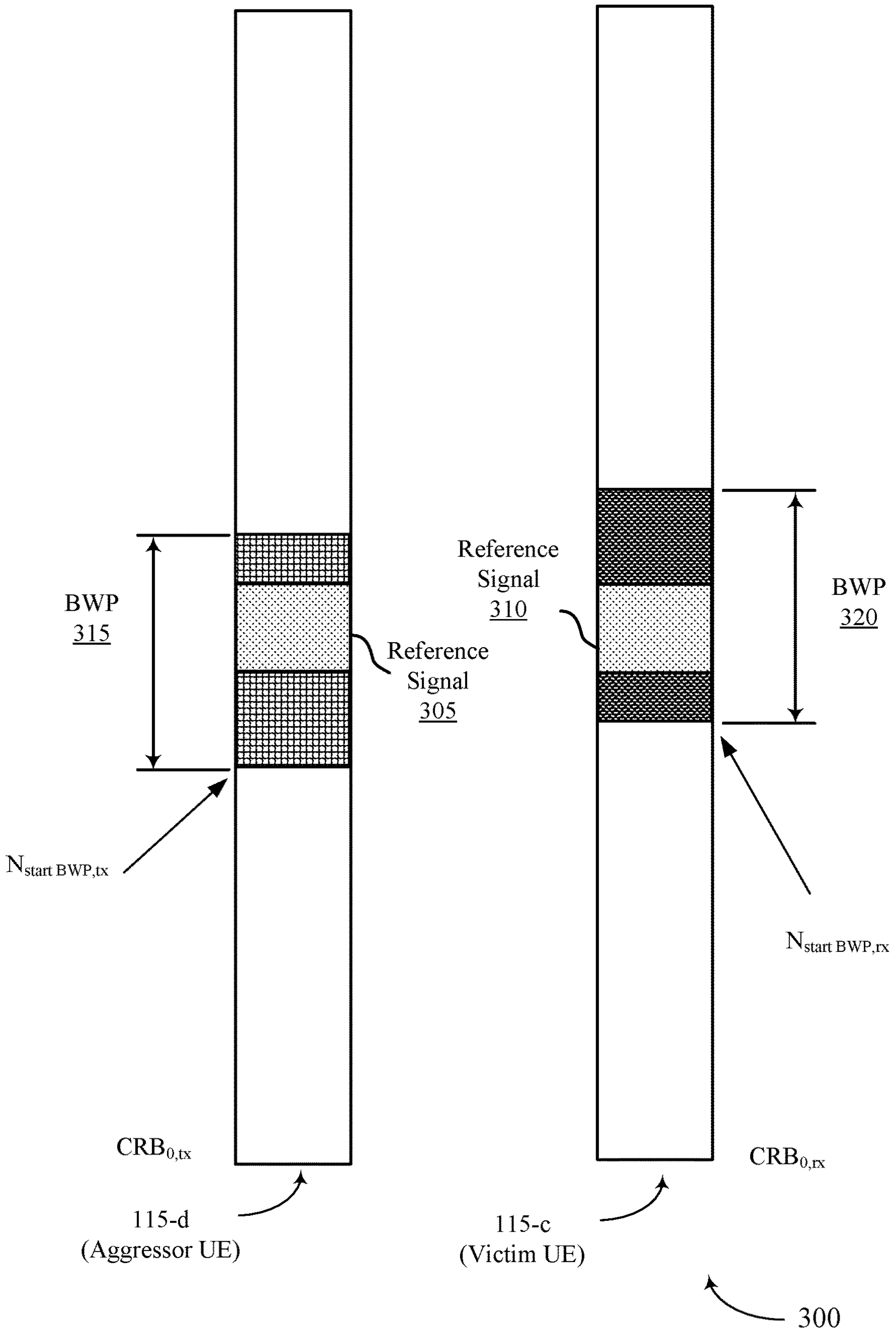
FIG. 3 illustrates an example of a resource configuration that supports channel state information enhancement with cross-link interference measurement in accordance with aspects of the present disclosure.

FIG. 3 illustrates an example of a resource configuration 300 that supports cross-link interference measurement in accordance with aspects of the present disclosure. In some examples, resource configuration 300 may implement, or be implemented by, aspects of wireless communications system 100, wireless communications system 200, or both. For example, the resource configuration 300 may illustrate a resource configuration for a victim UE 115-*c* and an aggressor UE 115-*d*, which may be examples of UEs 115 and as described herein.

As shown, a victim UE 115-*c* may be configured to measure SRS 305 transmissions from an aggressor UE 115-*d*. For example, a base station may configure the victim UE 115-*c*, via DCI, to have the same SRS configuration 310 as the aggressor UE 115-*d* in order to measure the SRSs 305 transmitted by the aggressor UE 115-*d*. The victim UE 115-*c* may calculate a reference signal received power of the SRS from the aggressor UE 115-*d* in order to calculate the CLI. An equivalent SRS resource configuration may be used for the aggressor and victim UEs 115-*d* and 115-*c* (e.g., an SRS resource 305 for transmission for the aggressor UE 115-*d* and an SRS resource 310 for measurement for the victim UE 115-*c*. Some configuration parameters for the victim UE 115-*c* SRS configuration 310 and the aggressor UE 115-*d* SRS configuration 305 may differ due to carrier bandwidth, and the bandwidth parts 315 and 320 may not be aligned. The serving base stations of the victim UE 115-*c* and the aggressor UE 115-*d* may coordinate to configure the victim UE 115-*c* and the aggressor UE 115-*d* to use the same SRS configurations 305 and 310.

A layer 3 CLI measurement procedure, as shown in resource configuration 300, may be insufficient to support dynamic measurement and reporting of CLI in full-duplexing scenarios, for example when the victim UE 115-*c* and the aggressor UE 115-*d* are within a same cell and controlled by the same base station.

Returning to FIG. 2, a CL-IMR may be configured for a victim UE 115-*a* to measure CLI via control signaling 220. The CL-IMR may be indicated within a report setting, such as within one or both of a CSI resource setting or a CSI report setting received from a base station 105-*a* in DCI. The CL-IMR may be aperiodic, semi-persistent, or periodic.

The time-frequency resource pattern of the CL-IMR may be equivalent to that of an SRS resource (or other reference signal for CLI measurement) transmitted by an aggressor UE 115-*b*. For example, the base station 105-*a* may transmit control signaling 230 (e.g., via an RRC message) to the aggressor UE 115-*b* scheduling a reference signal transmission corresponding to the time-frequency resource pattern of the CL-IMR configured in the control signaling 220 transmitted to the victim UE 115-*a*. In some cases, the base station 105-*a* may schedule an aperiodic CLI measurement via a control message 225. In some examples, the base station 105-*a* may transmit a common DCI indicating a timing and a resource for the aggressor UE 115-*b* to transmit one or more reference signals and the timing and the resource for the victim UE 115-*a* to perform the CLI measurement using the configured CL-IMR. For example, the base station 105-*a* may transmit the messages 225 and 230 within a common DCI. In some cases, the base station 105-*a* may transmit the messages 225 and 230 scheduling an aperiodic CLI measurement to the victim UE 115-*a* and a transmission of one or more reference signals to the aggressor UE 115-*b* in separate DCI (e.g., separate triggering).

The victim UE 115-*a* may perform a CLI measurement on uplink signals 235 transmitted by the aggressor UE 115-*b* using the configured CL-IMR and report the measured CLI to the base station 105-*a* in a reporting message 240.

The CL-IMR may include one or more resources which may be one-to-one mapped with CMRs. The CL-IMR may include a plurality of time-frequency resources, and each time-frequency resource of the CL-IMR may be one-to-one mapped to a resource of CMR. In some examples, each resource of CL-IMR may correspond to a different transmit beam of the aggressor UE 115-*b*. In some examples, more than one aggressor UE 115 may cause CLI, and each resource of CL-IMR may correspond to a different transmit beam transmitted by each aggressor UE 115. The CL-IMR may be configured with legacy IMRs, such as CSI-IM and NZP-IMR. The CL-IMR may be quasi co-located (Type D)

with the corresponding CMR. In some examples, if the CMR is configured as an NZP-CSI-RS resource set with the higher layer parameter repetition set to "on" (e.g., CSI-RS for P3 beam management), the victim UE 115-*a* may assume that the SRS resources associated with the CL-IMR may be transmitted with the same transmit beam from the aggressor UE 115-*b*. Accordingly, the victim UE 115-*a* may use that CMR to find a receive beam with lower CLI or a higher signal to interference and noise ratio (SINR).

In some examples, a victim UE 115-*a* may consider the CLI measurement through the CL-IMR when the victim UE 115-*a* calculates and reports CSI to the base station 105-*a* (e.g., the CLI measurement may be taken into account when calculating a layer one reference signal received power, a layer one signal to interference and noise ratio, a precoding matrix index, a rank indicator, a channel quality indicator, or a layer one received signal strength indicator).

Figure 4:
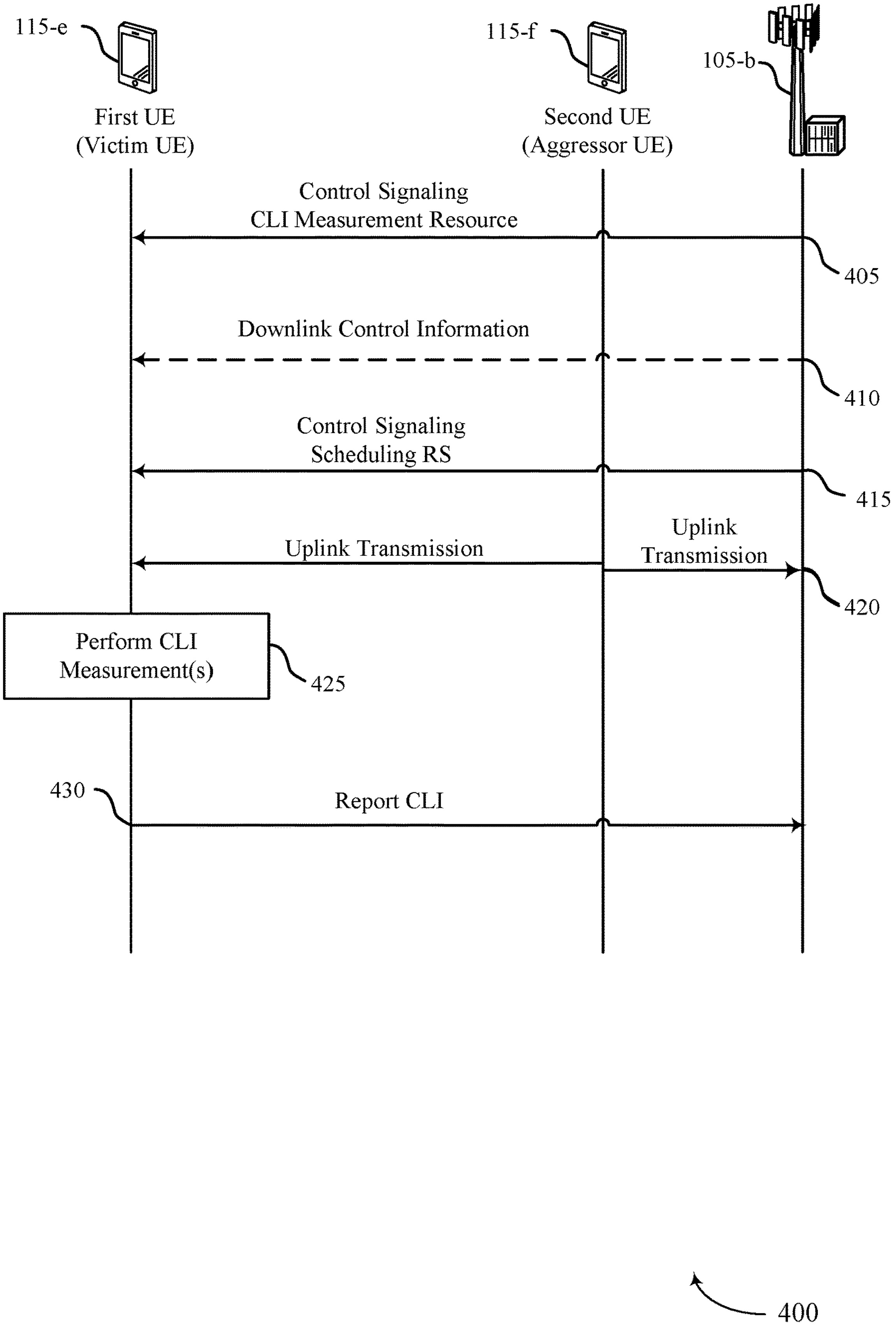
FIG. 4 illustrates an example of a process flow that supports channel state information enhancement with cross-link interference measurement in accordance with aspects of the present disclosure.

FIG. 4 illustrates an example of a process flow 400 that supports channel state information enhancement with cross-link interference measurement in accordance with aspects of the present disclosure. In some examples, process flow 400 may implement, or be implemented by, aspects of wireless communications system 100, wireless communications system 200, or both. For example, base station 105-*b* may be an example of a base station 105 as described herein, and UE 115-*e* and UE 115-*f* may be examples of a UE 115 as described herein.

At 405, the victim UE 115-*e* receives, from the base station 105-*b*, control signaling indicating one or both of a CSI resource setting or a CSI reporting setting, where a configuration for a CL-IMR for performing a cross-link interference measurement of communications from the aggressor UE 115-*f* to the base station 105-*b* is indicated in one or both of the CSI resource setting or the CSI reporting setting. In some examples, the control signaling may be transmitted via an RRC message or a DCI message.

In some examples, the control signaling indicates the CL-IMR from a plurality of CSI resources. In some examples, the CL-IMR may include a plurality of time-frequency resources which may each be one-to-one mapped with a respective CMR of a plurality of CMRs. In some examples, each time-frequency resource of the CL-IMR may be quasi co-located (Type D) with the respective one-to-one mapped CMR of the plurality of CMRs.

In some examples, at 410 the base station 105-*b* may transmit, to the victim UE 115-*e*, DCI indicating an aperiodic CLI measurement using the indicated CL-IMR. At 415, the base station 105-*b* may transmit, to the aggressor UE 115-*f*, control signaling scheduling a reference signal (e.g., an SRS) during a timing of the CL-IMR. In some examples, the base station 105-*b* may transmit the DCI at 410 and the control signaling at 415 scheduling an aperiodic CLI measurement in common DCI to both the victim UE 115-*e* and the aggressor UE 115-*f*. In some examples, the base station 105-*b* may transmit the DCI at 410 and the control signaling at 415 scheduling an aperiodic CLI measurement in separate DCI messages.

At 420, the aggressor UE 115-*f* may transmit an uplink transmission (e.g., a reference signal) scheduled by the base station 105-*b*. At 425, the victim UE 115-*e* may perform a CLI measurement on the uplink transmission using the CL-IMR. In some examples, the victim UE 115-*e* may measure a signal strength of a reference signal transmitted by the aggressor UE 115-*f* using the CL-IMR to measure the CLI.

In some examples, the control signaling received at 405 may indicate that the CL-IMR includes a plurality of time-frequency resources, and performing the CLI measurement at 425 may include measuring a plurality of beams transmitted by the aggressor UE 115-*f*, where each beam of the plurality of beams may be measured via a respective time-frequency resource of the CL-IMR. In some examples, the control signaling received at 405 may indicate that the CL-IMR includes a plurality of time-frequency resources, and performing the CLI measurement at 425 may include measuring a plurality of beams transmitted by a plurality of aggressor UEs (where the plurality of aggressor UEs includes the aggressor UE 115-*f*), where each beam of the plurality of beams may be measured via a respective time-frequency resource of the CL-IMR. For example, the base station 105-*b* may configure the plurality of aggressor UEs to transmit reference signals during time periods associated with the time-frequency resources of the CL-IMR.

At 430, the victim UE 115-*e* may transmit a report indicating the CLI measurement to the base station 105-*b*. In some examples, the victim UE 115-*e* may calculate a CSI of a link between the victim UE 115-*e* and the base station 105-*b* based in part on the measured CLI, and transmitting the report at 430 may include transmitting the calculated CSI. In some examples, calculating the CSI may include calculating a layer one reference signal received power, a layer one signal to interference and noise ratio, a precoding matrix index, a rank indicator, a channel quality indicator, a layer one received signal strength indicator, or a combination thereof.

Figure 5:
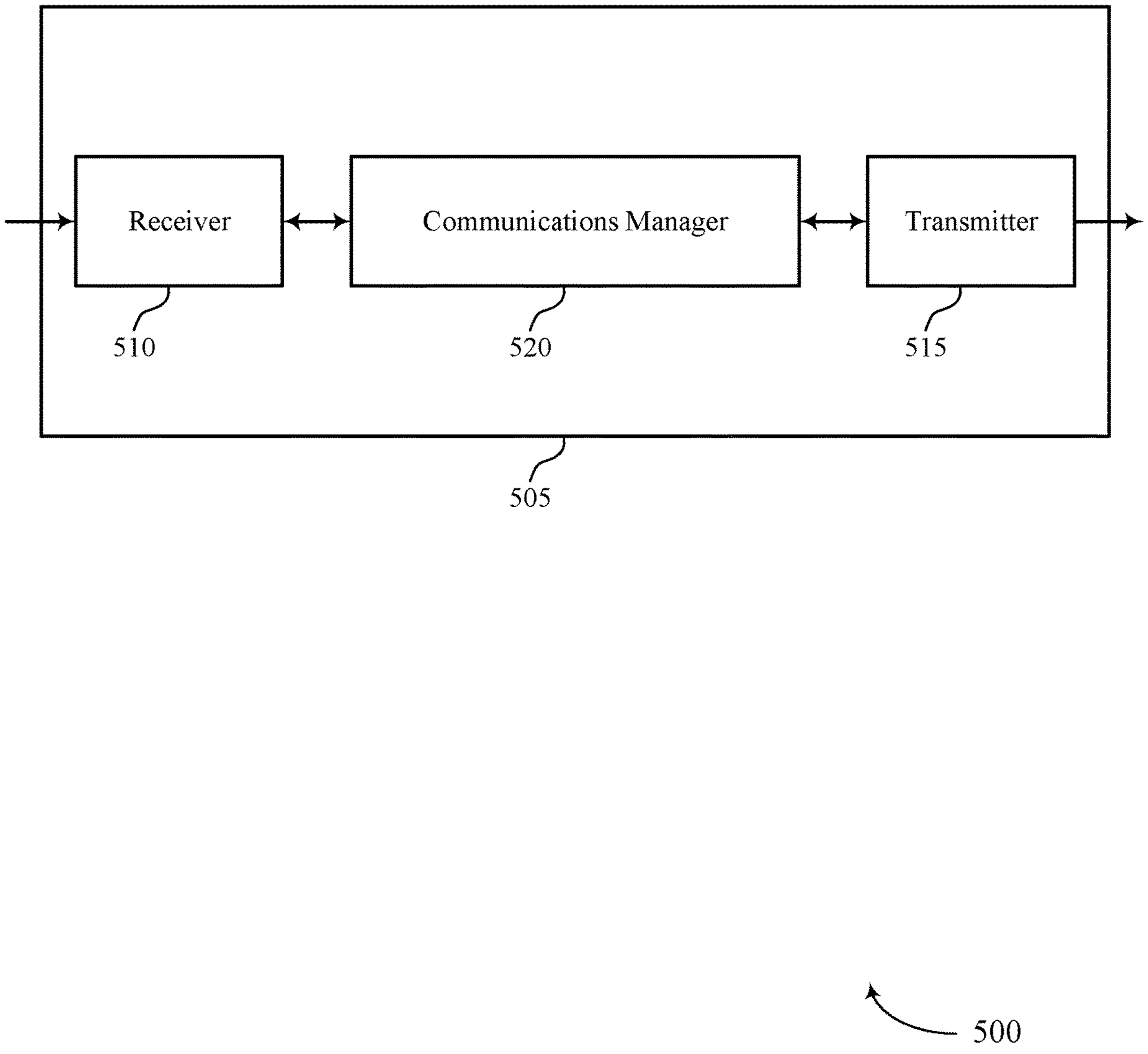
FIGS. 5 and 6 show block diagrams of devices that support channel state information enhancement with cross-link interference measurement in accordance with aspects of the present disclosure.

FIG. 5 shows a block diagram 500 of a device 505 that supports channel state information enhancement with cross-link interference measurement in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to channel state information enhancement with cross-link interference measurement). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to channel state information enhancement with cross-link interference measurement). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of channel state information enhancement with cross-link interference measurement as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. For example, the communications manager 520 may be configured as or otherwise support a means for receiving, from a base station, control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting. The communications manager 520 may be configured as or otherwise support a means for performing the cross-link interference measurement of the communications from the second UE based on the configuration. The communications manager 520 may be configured as or otherwise support a means for transmitting, to the base station, a report indicating the cross-link interference measurement.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for dynamic measurement of CLI. As such, the techniques described herein may lead to more efficient utilization of communication resources.

Figure 6:
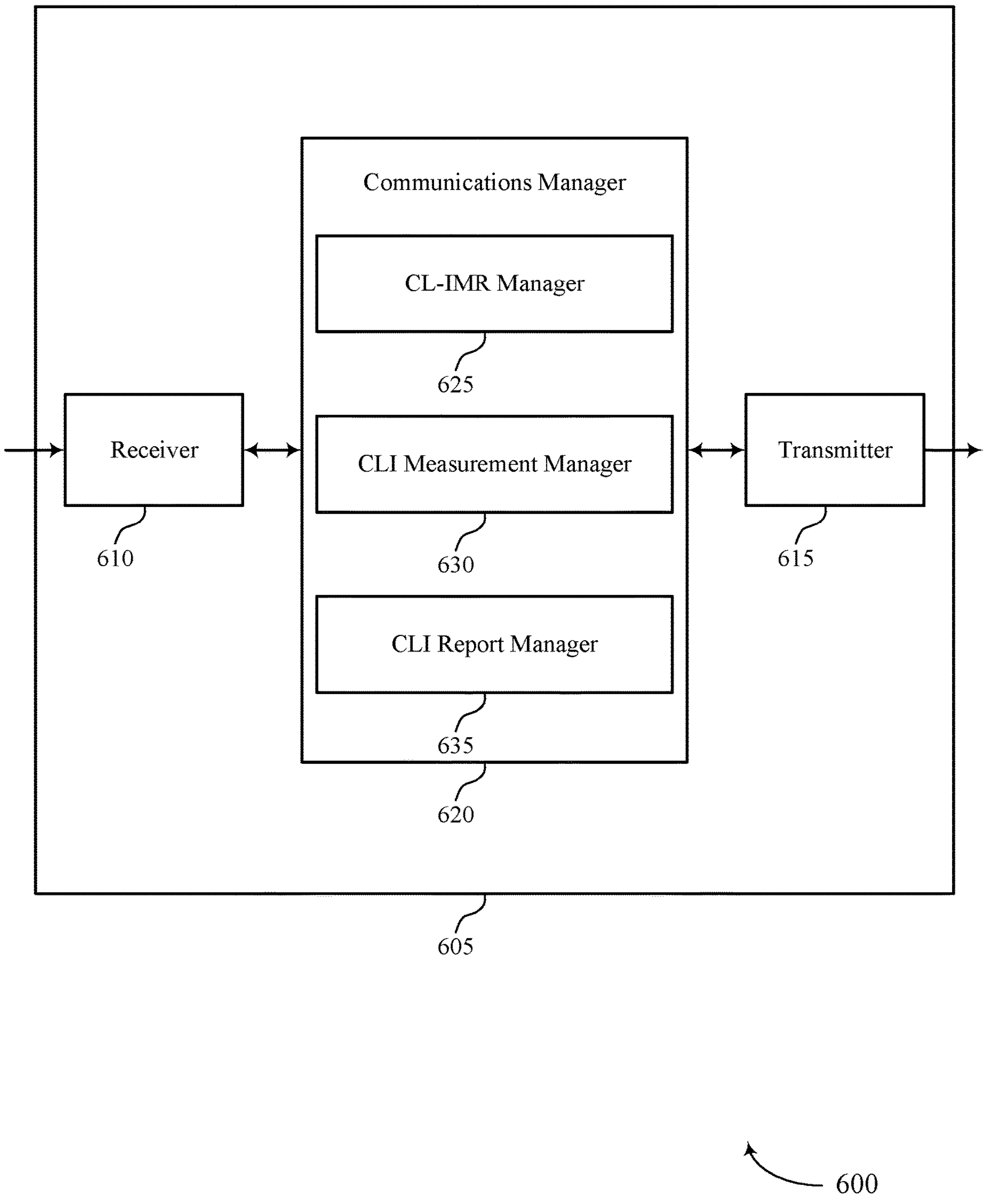

FIG. 6 shows a block diagram 600 of a device 605 that supports channel state information enhancement with cross-link interference measurement in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to channel state information enhancement with cross-link interference measurement). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to channel state information enhancement with cross-link interference measurement). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of channel state information enhancement with cross-link interference measurement as described herein. For example, the communications manager 620 may include a CL-IMR Manager 625, a CLI Measurement Manager 630, a CLI Report Manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. The CL-IMR Manager 625 may be configured as or otherwise support a means for receiving, from a base station, control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting. The CLI Measurement Manager 630 may be configured as or otherwise support a means for performing the cross-link interference measurement of the communications from the second UE based on the configuration. The CLI Report Manager 635 may be configured as or otherwise support a means for transmitting, to the base station, a report indicating the cross-link interference measurement.

Figure 7:
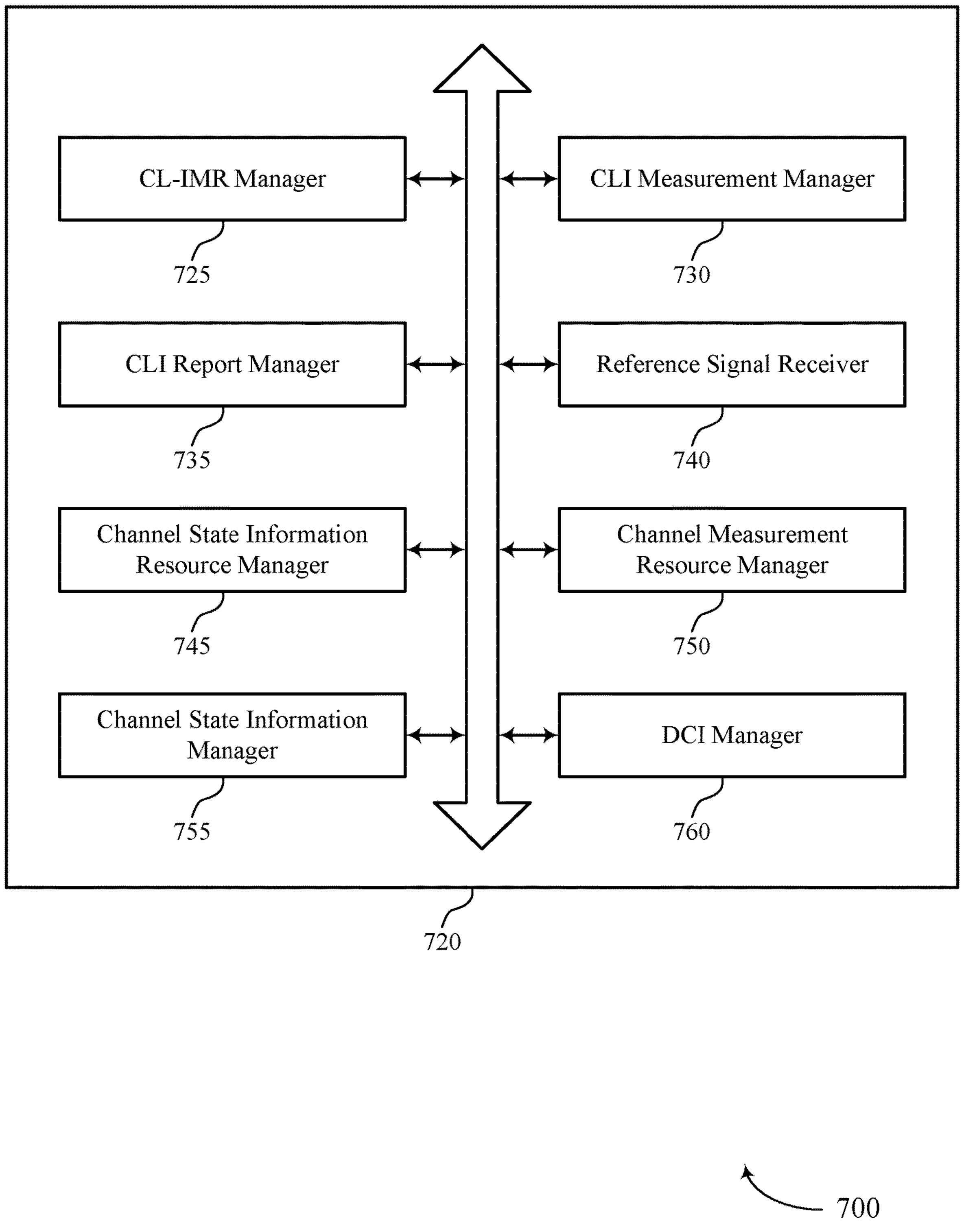
FIG. 7 shows a block diagram of a communications manager that supports channel state information enhancement with cross-link interference measurement in accordance with aspects of the present disclosure.

FIG. 7 shows a block diagram 700 of a communications manager 720 that supports channel state information enhancement with cross-link interference measurement in accordance with aspects of the present disclosure. The communications manager 720 may be an example of aspects of a communications manager 520, a communications manager 620, or both, as described herein. The communications manager 720, or various components thereof, may be an example of means for performing various aspects of channel state information enhancement with cross-link interference measurement as described herein. For example, the communications manager 720 may include a CL-IMR Manager 725, a CLI Measurement Manager 730, a CLI Report Manager 735, a Reference Signal Receiver 740, a Channel State Information Resource Manager 745, a Channel Measurement Resource Manager 750, a Channel State Information Manager 755, a DCI Manager 760, or any combination thereof. Each of these components may communicate, directly or indirectly, with one another (e.g., via one or more buses).

The communications manager 720 may support wireless communications at a first UE in accordance with examples as disclosed herein. The CL-IMR Manager 725 may be configured as or otherwise support a means for receiving, from a base station, control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting. The CLI Measurement Manager 730 may be configured as or otherwise support a means for performing the cross-link interference measurement of the communications from the second UE based on the configuration. The CLI Report Manager 735 may be configured as or otherwise support a means for transmitting, to the base station, a report indicating the cross-link interference measurement.

In some examples, to support performing the cross-link interference measurement, the Reference Signal Receiver 740 may be configured as or otherwise support a means for receiving, from the second UE, a reference signal during the cross-link interference measurement resource. In some examples, to support performing the cross-link interference measurement, the CLI Measurement Manager 730 may be configured as or otherwise support a means for measuring a signal strength of the reference signal.

In some examples, to support receiving the control signaling, the CL-IMR Manager 725 may be configured as or otherwise support a means for receiving an indication that the configuration for the cross-link interference measurement resource includes a set of multiple time-frequency resources, where performing the cross-link interference measurement of the second UE includes. In some examples, to support receiving the control signaling, the CLI Measurement Manager 730 may be configured as or otherwise support a means for measuring a set of multiple beams transmitted by the second UE, where each beam of the set of multiple beams is measured via a respective time-frequency resource of the set of multiple time-frequency resources.

In some examples, to support receiving the control signaling, the CL-IMR Manager 725 may be configured as or otherwise support a means for receiving an indication that the configuration for the cross-link interference measurement resource includes a set of multiple time-frequency resources, where performing the cross-link interference measurement of the second UE includes. In some examples, to support receiving the control signaling, the CLI Measurement Manager 730 may be configured as or otherwise support a means for measuring a set of multiple beams transmitted by a set of multiple UEs, where the set of multiple UEs includes the second UE, and where each beam of the set of multiple beams is measured via a respective time-frequency resource of the set of multiple time-frequency resources.

In some examples, to support receiving the control signaling, the Channel State Information Resource Manager 745 may be configured as or otherwise support a means for receiving an indication of a set of multiple channel state information resources, where the configuration identifies the cross-link interference measurement resource from the set of multiple channel state information resources.

In some examples, to support receiving the control signaling, the Channel Measurement Resource Manager 750 may be configured as or otherwise support a means for receiving an indication that the configuration for the cross-link interference measurement resource includes a set of multiple time-frequency resources, where each time-frequency resource of the set of multiple time-frequency resources is one-to-one mapped with a respective channel measurement resource of a set of multiple channel measurement resources.

In some examples, each time-frequency resource of the set of multiple time-frequency resources is quasi co-located with the respective one-to-one mapped channel measurement resource of the set of multiple channel measurement resources.

In some examples, the Channel State Information Manager 755 may be configured as or otherwise support a means for calculating a channel state information of a link between the first UE and the base station based on the cross-link interference measurement of the second UE, where transmitting the report indicating the cross-link interference measurement includes transmitting the calculated channel state information.

In some examples, to support calculating the channel state information, the Channel State Information Manager 755 may be configured as or otherwise support a means for calculating a layer one reference signal received power, a layer one signal to interference and noise ratio, a precoding matrix index, a rank indicator, a channel quality indicator, a layer one received signal strength indicator, or a combination thereof.

In some examples, the DCI Manager 760 may be configured as or otherwise support a means for receiving, from the base station, a downlink control information message indicating an aperiodic cross-link interference measurement and reporting using the configuration for the cross-link interference measurement resource.

Figure 8:
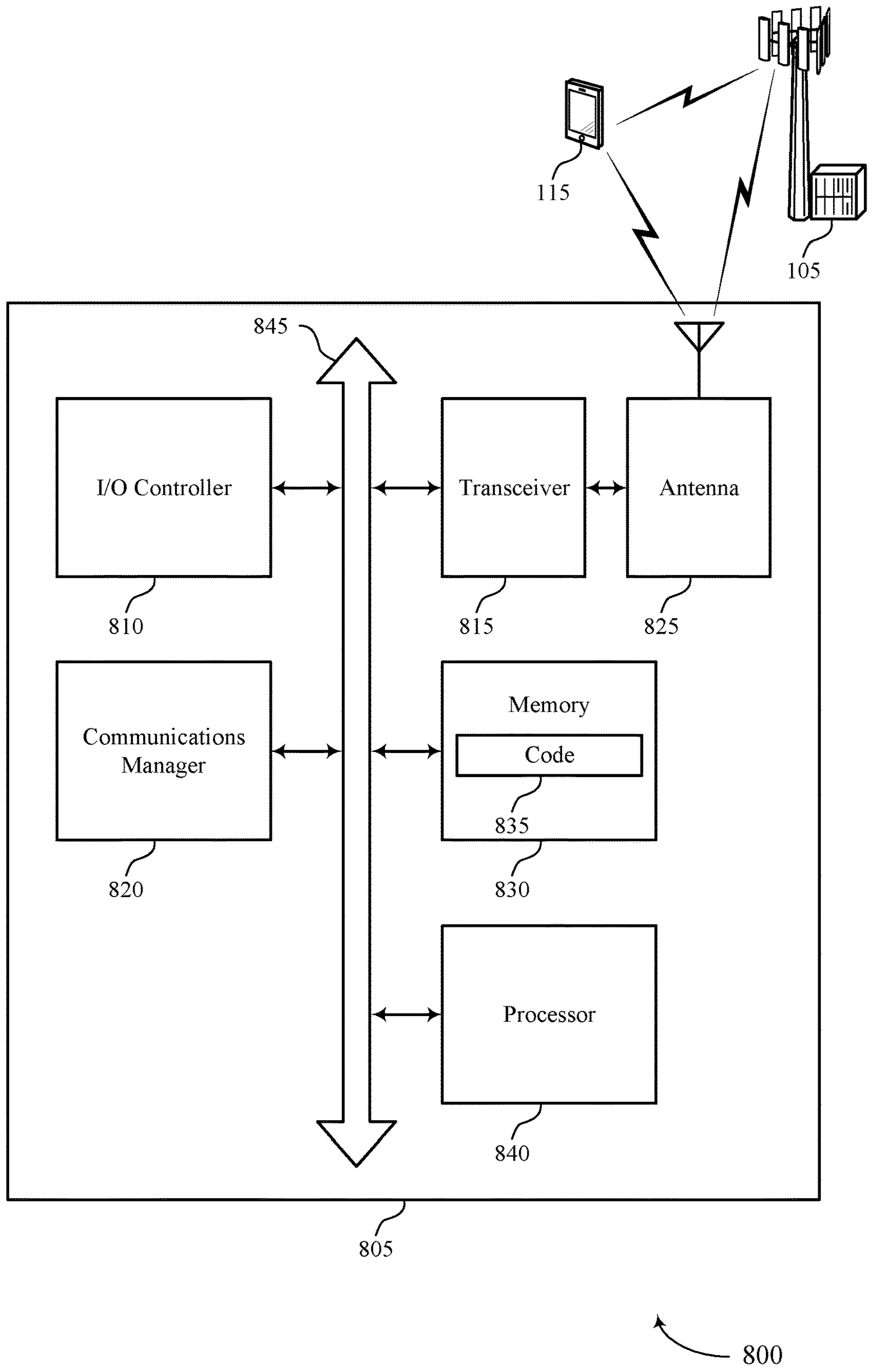
FIG. 8 shows a diagram of a system including a device that supports channel state information enhancement with cross-link interference measurement in accordance with aspects of the present disclosure.

FIG. 8 shows a diagram of a system 800 including a device 805 that supports channel state information enhancement with cross-link interference measurement in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting channel state information enhancement with cross-link interference measurement). For example, the device 805 or a component of the device 805 may include a processor 840 and memory 830 coupled to the processor 840, the processor 840 and memory 830 configured to perform various functions described herein.

The communications manager 820 may support wireless communications at a first UE in accordance with examples as disclosed herein. For example, the communications manager 820 may be configured as or otherwise support a means for receiving, from a base station, control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting. The communications manager 820 may be configured as or otherwise support a means for performing the cross-link interference measurement of the communications from the second UE based on the configuration. The communications manager 820 may be configured as or otherwise support a means for transmitting, to the base station, a report indicating the cross-link interference measurement.

By including or configuring the communications manager 820 in accordance with examples as described herein, the device 805 may support techniques for may support techniques for dynamic measurement of CLI. As such, the techniques described herein may lead to improved communication reliability, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of channel state information enhancement with cross-link interference measurement as described herein, or the processor 840 and the memory 830 may be otherwise configured to perform or support such operations.

Figure 9:
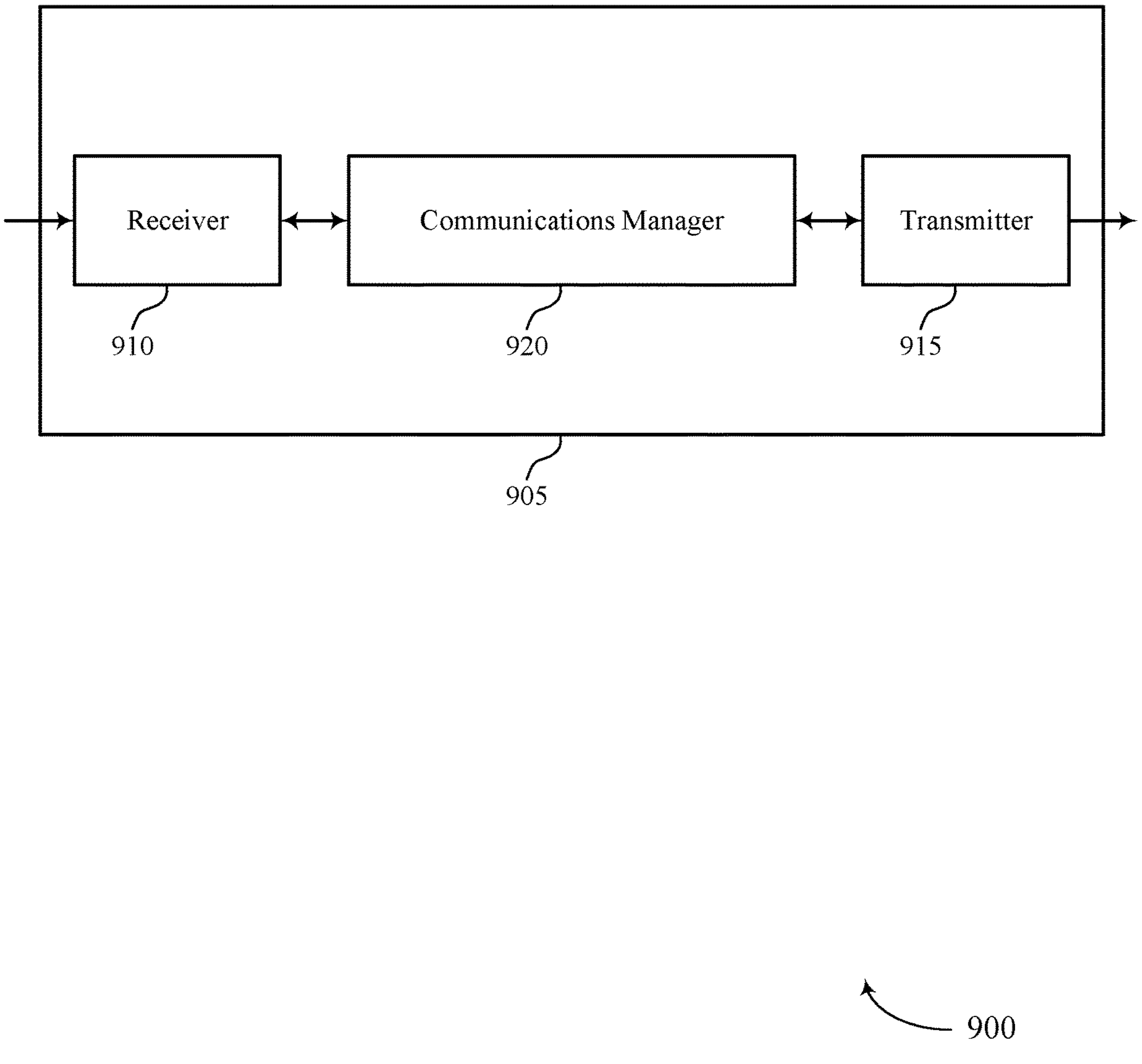
FIGS. 9 and 10 show block diagrams of devices that support channel state information enhancement with cross-link interference measurement in accordance with aspects of the present disclosure.

FIG. 9 shows a block diagram 900 of a device 905 that supports channel state information enhancement with cross-link interference measurement in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to channel state information enhancement with cross-link interference measurement). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to channel state information enhancement with cross-link interference measurement). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of channel state information enhancement with cross-link interference measurement as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a first UE, first control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting. The communications manager 920 may be configured as or otherwise support a means for transmitting, to the second UE, second control signaling indicating a timing for a transmission of a reference signal by the second UE. The communications manager 920 may be configured as or otherwise support a means for receiving, from the first UE, a report indicating the cross-link interference measurement of the second UE.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for may support techniques for dynamic measurement of CLI. As such, the techniques described herein may lead to more efficient utilization of communication resources.

Figure 10:
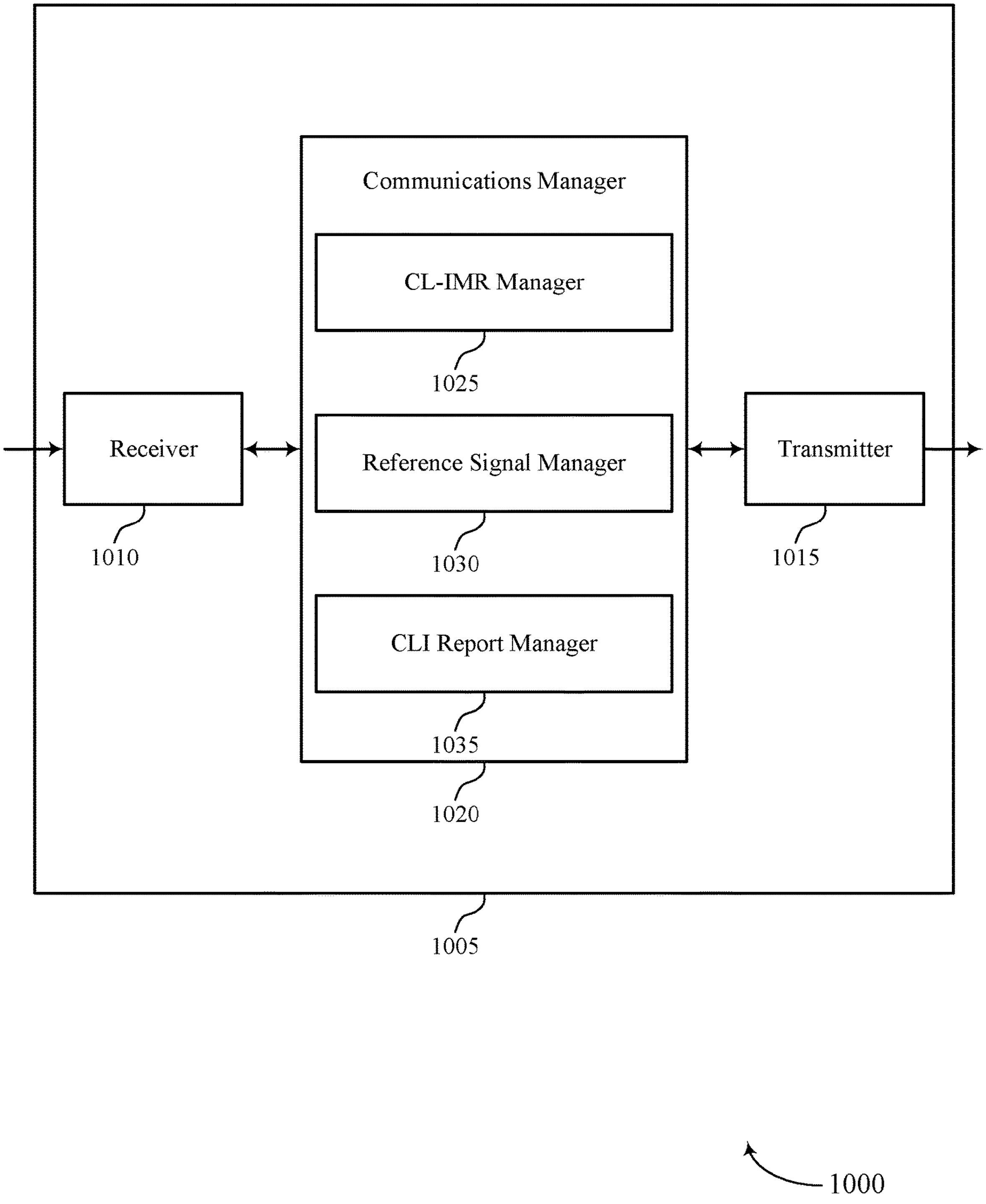

FIG. 10 shows a block diagram 1000 of a device 1005 that supports channel state information enhancement with cross-link interference measurement in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to channel state information enhancement with cross-link interference measurement). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to channel state information enhancement with cross-link interference measurement). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of channel state information enhancement with cross-link interference measurement as described herein. For example, the communications manager 1020 may include a CL-IMR Manager 1025, a Reference Signal Manager 1030, a CLI Report Manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The CL-IMR Manager 1025 may be configured as or otherwise support a means for transmitting, to a first UE, first control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting. The Reference Signal Manager 1030 may be configured as or otherwise support a means for transmitting, to the second UE, second control signaling indicating a timing for a transmission of a reference signal by the second UE. The CLI Report Manager 1035 may be configured as or otherwise support a means for receiving, from the first UE, a report indicating the cross-link interference measurement of the second UE.

Figure 11:
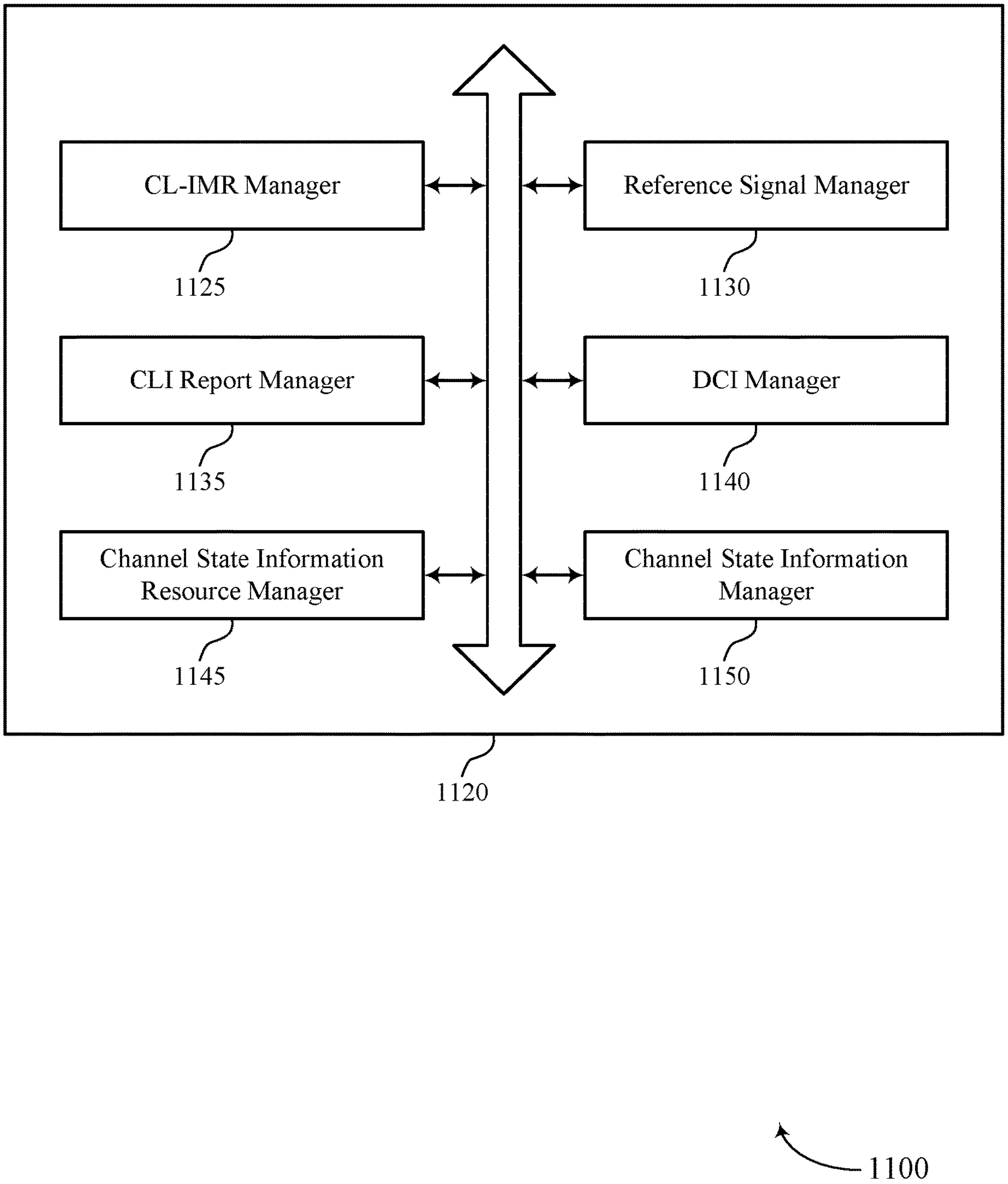
FIG. 11 shows a block diagram of a communications manager that supports channel state information enhancement with cross-link interference measurement in accordance with aspects of the present disclosure.

FIG. 11 shows a block diagram 1100 of a communications manager 1120 that supports channel state information enhancement with cross-link interference measurement in accordance with aspects of the present disclosure. The communications manager 1120 may be an example of aspects of a communications manager 920, a communications manager 1020, or both, as described herein. The communications manager 1120, or various components thereof, may be an example of means for performing various aspects of channel state information enhancement with cross-link interference measurement as described herein. For example, the communications manager 1120 may include a CL-IMR Manager 1125, a Reference Signal Manager 1130, a CLI Report Manager 1135, a DCI Manager 1140, a Channel State Information Resource Manager 1145, a Channel State Information Manager 1150, or any combination thereof. Each of these components may communicate, directly or indirectly, with one another (e.g., via one or more buses).

The communications manager 1120 may support wireless communications at a base station in accordance with examples as disclosed herein. The CL-IMR Manager 1125 may be configured as or otherwise support a means for transmitting, to a first UE, first control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting. The Reference Signal Manager 1130 may be configured as or otherwise support a means for transmitting, to the second UE, second control signaling indicating a timing for a transmission of a reference signal by the second UE. The CLI Report Manager 1135 may be configured as or otherwise support a means for receiving, from the first UE, a report indicating the cross-link interference measurement of the second UE.

In some examples, the DCI Manager 1140 may be configured as or otherwise support a means for transmitting, to the first UE and the second UE, a common downlink control information message to the first UE and the second UE indicating an aperiodic cross-link interference measurement reporting using the configuration for the cross-link interference measurement resource, where the common downlink control information message includes the second control signaling.

In some examples, the DCI Manager 1140 may be configured as or otherwise support a means for transmitting, to the first UE, a downlink control information message indicating an aperiodic cross-link interference measurement and reporting using the configuration for the cross-link interference measurement resource.

In some examples, to support transmitting the first control signaling, the CL-IMR Manager 1125 may be configured as or otherwise support a means for transmitting a first indication that the configuration for the cross-link interference measurement resource includes a set of multiple time-frequency resources, and where transmitting the second control signaling includes. In some examples, to support transmitting the first control signaling, the Reference Signal Manager 1130 may be configured as or otherwise support a means for transmitting a second indication of a scheduling of a set of multiple beam transmissions by the second UE, where each beam transmission is associated with a respective time-frequency resource of the set of multiple time-frequency resources.

In some examples, to support transmitting the first control signaling, the CL-IMR Manager 1125 may be configured as or otherwise support a means for transmitting a first indication that the configuration for the cross-link interference measurement resource includes a set of multiple time-frequency resources, and where transmitting the second control signaling includes. In some examples, to support transmitting the first control signaling, the Reference Signal Manager 1130 may be configured as or otherwise support a means for transmitting, to a set of multiple UEs, a second indication of a scheduling of a set of multiple beam transmissions by the set of multiple UEs, where the set of multiple UEs includes the second UE, and where each beam transmission is associated with a respective time-frequency resource of the set of multiple time-frequency resources.

In some examples, to support transmitting the first control signaling, the Channel State Information Resource Manager 1145 may be configured as or otherwise support a means for transmitting an indication of a set of multiple channel state information resources, where the configuration identifies the cross-link interference measurement resource from the set of multiple channel state information resources.

In some examples, to support transmitting the first control signaling, the CL-IMR Manager 1125 may be configured as or otherwise support a means for transmitting an indication that the configuration for the cross-link interference measurement resource includes a set of multiple time-frequency resources, where each time-frequency resource of the set of multiple time-frequency resources is one-to-one mapped with a respective channel measurement resource of a set of multiple channel measurement resources.

In some examples, each time-frequency resource of the set of multiple time-frequency resources is quasi co-located with the respective one-to-one mapped channel measurement resource of the set of multiple channel measurement resources.

In some examples, to support receiving the report indicating the cross-link interference measurement, the Channel State Information Manager 1150 may be configured as or otherwise support a means for receiving an indication of a channel state information of a link between the first UE and the base station.

Figure 12:
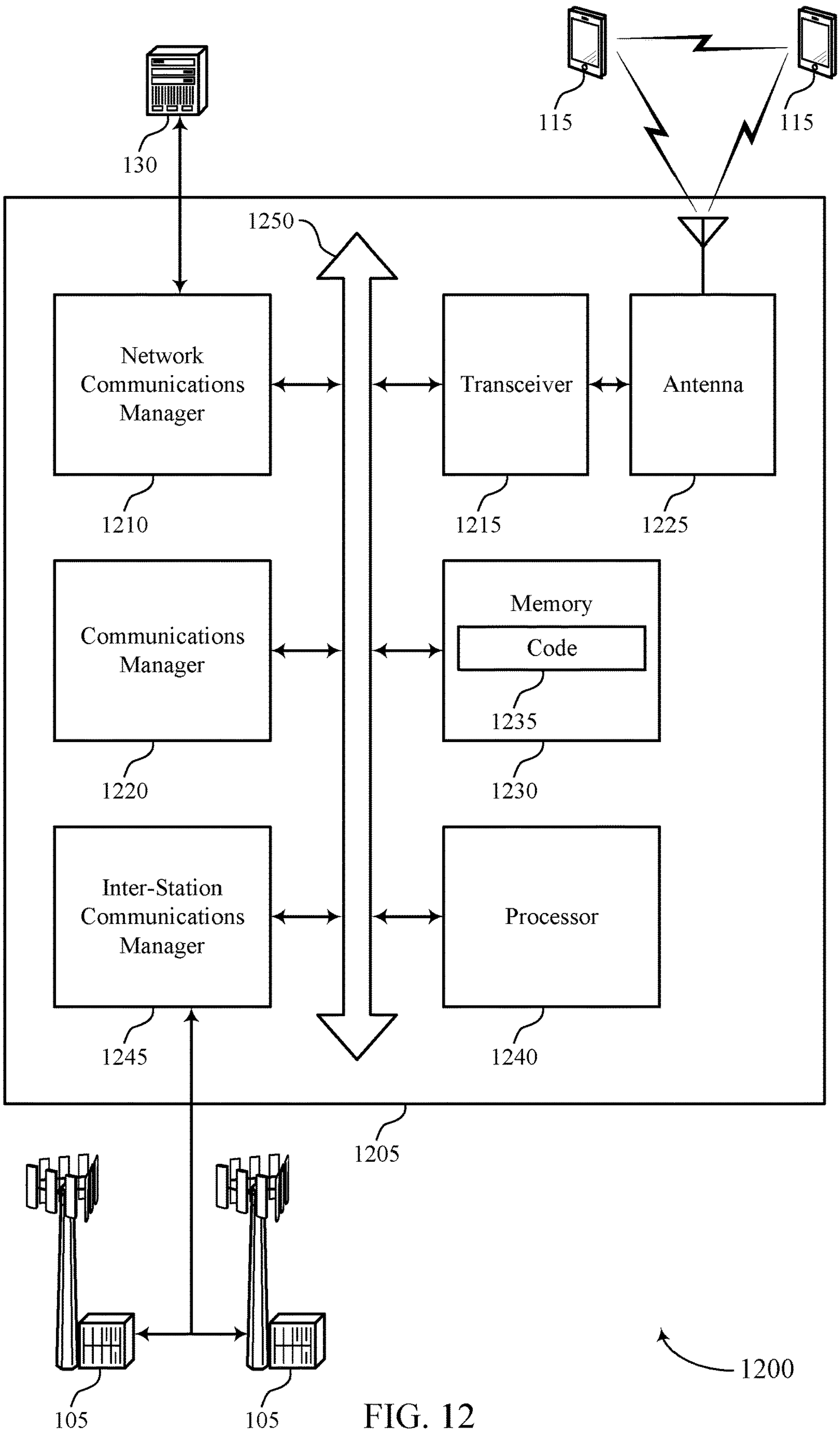
FIG. 12 shows a diagram of a system including a device that supports channel state information enhancement with cross-link interference measurement in accordance with aspects of the present disclosure.

FIG. 12 shows a diagram of a system 1200 including a device 1205 that supports channel state information enhancement with cross-link interference measurement in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting channel state information enhancement with cross-link interference measurement). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a first UE, first control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting. The communications manager 1220 may be configured as or otherwise support a means for transmitting, to the second UE, second control signaling indicating a timing for a transmission of a reference signal by the second UE. The communications manager 1220 may be configured as or otherwise support a means for receiving, from the first UE, a report indicating the cross-link interference measurement of the second UE.

By including or configuring the communications manager 1220 in accordance with examples as described herein, the device 1205 may support techniques for may support techniques for dynamic measurement of CLI. As such, the techniques described herein may lead to improved communication reliability, more efficient utilization of communication resources, and improved coordination between devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of channel state information enhancement with cross-link interference measurement as described herein, or the processor 1240 and the memory 1230 may be otherwise configured to perform or support such operations.

Figure 13:
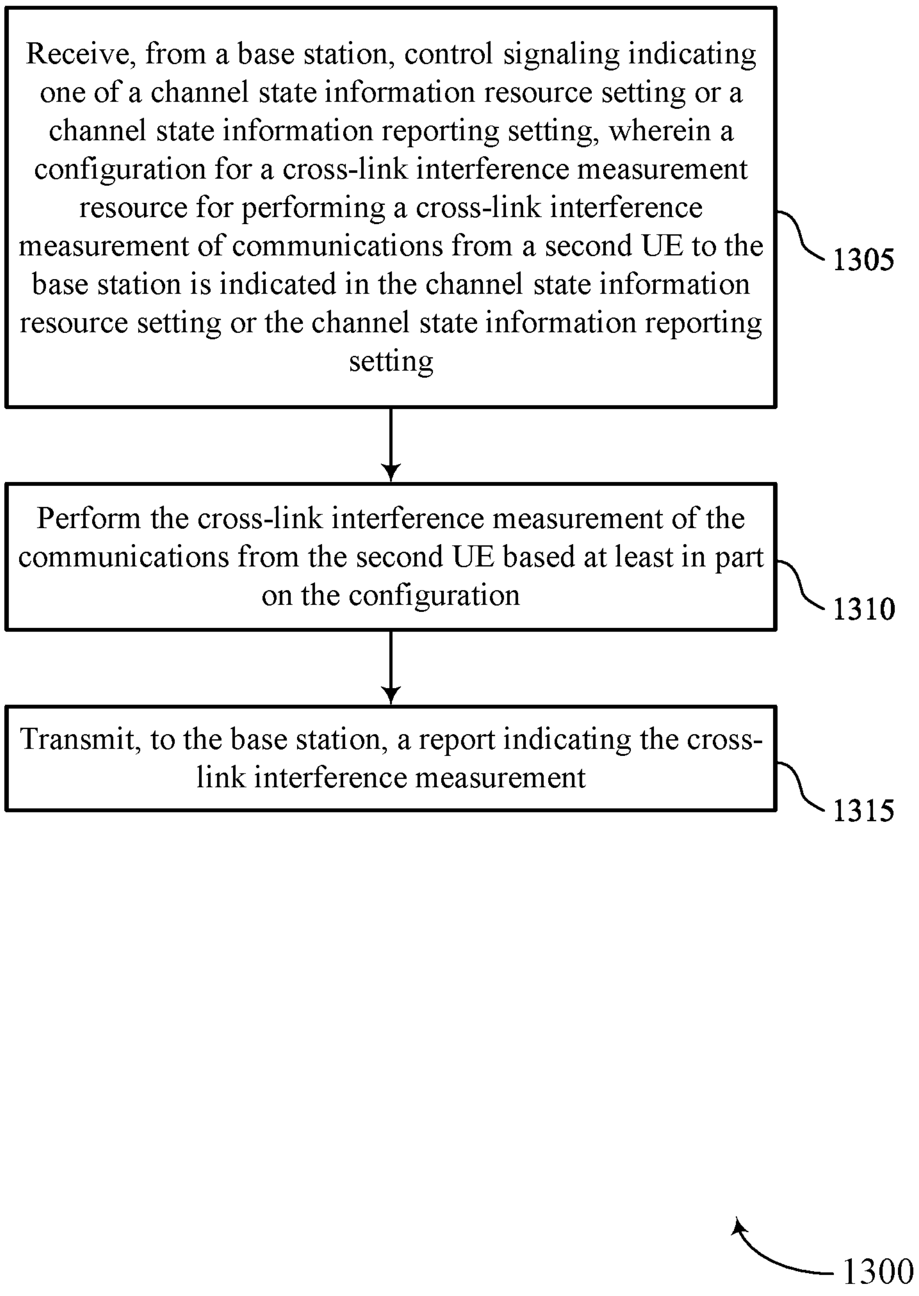
FIGS. 13 through 17 show flowcharts illustrating methods that support channel state information enhancement with cross-link interference measurement in accordance with aspects of the present disclosure.

FIG. 13 shows a flowchart illustrating a method 1300 that supports channel state information enhancement with cross-link interference measurement in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting. The operations of 1305 may be performed in accordance with examples as disclosed herein. In some examples, aspects of the operations of 1305 may be performed by a CL-IMR Manager 725 as described with reference to FIG. 7.

At 1310, the method may include performing the cross-link interference measurement of the communications from the second UE based on the configuration. The operations of 1310 may be performed in accordance with examples as disclosed herein. In some examples, aspects of the operations of 1310 may be performed by a CLI Measurement Manager 730 as described with reference to FIG. 7.

At 1315, the method may include transmitting, to the base station, a report indicating the cross-link interference measurement. The operations of 1315 may be performed in accordance with examples as disclosed herein. In some examples, aspects of the operations of 1315 may be performed by a CLI Report Manager 735 as described with reference to FIG. 7.

Figure 14:
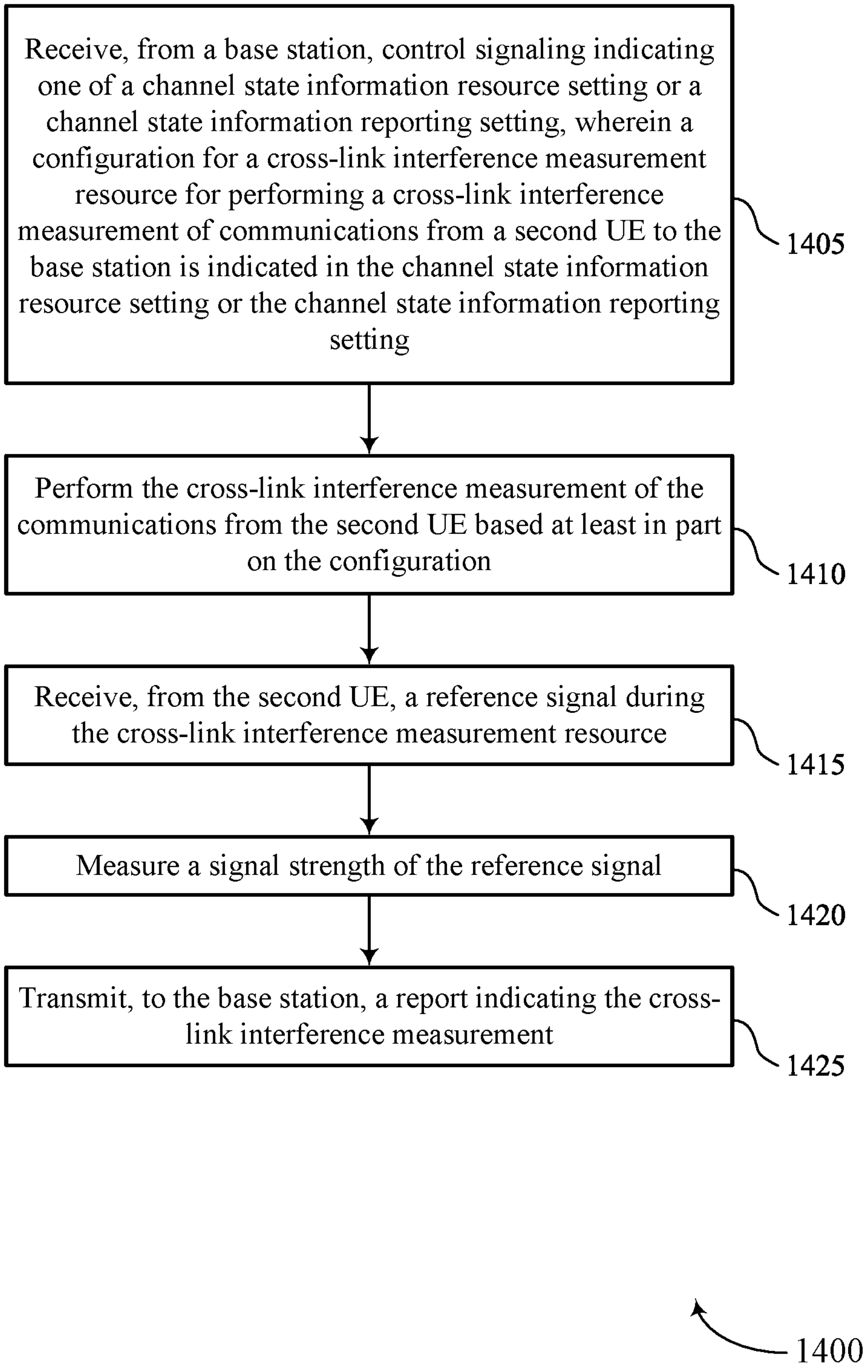

FIG. 14 shows a flowchart illustrating a method 1400 that supports channel state information enhancement with cross-link interference measurement in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting. The operations of 1405 may be performed in accordance with examples as disclosed herein. In some examples, aspects of the operations of 1405 may be performed by a CL-IMR Manager 725 as described with reference to FIG. 7.

At 1410, the method may include performing the cross-link interference measurement of the communications from the second UE based on the configuration. The operations of 1410 may be performed in accordance with examples as disclosed herein. In some examples, aspects of the operations of 1410 may be performed by a CLI Measurement Manager 730 as described with reference to FIG. 7.

At 1415, the method may include receiving, from the second UE, a reference signal during the cross-link interference measurement resource. The operations of 1415 may be performed in accordance with examples as disclosed herein. In some examples, aspects of the operations of 1415 may be performed by a Reference Signal Receiver 740 as described with reference to FIG. 7.

At 1420, the method may include measuring a signal strength of the reference signal. The operations of 1420 may be performed in accordance with examples as disclosed herein. In some examples, aspects of the operations of 1420 may be performed by a CLI Measurement Manager 730 as described with reference to FIG. 7.

At 1425, the method may include transmitting, to the base station, a report indicating the cross-link interference measurement. The operations of 1425 may be performed in accordance with examples as disclosed herein. In some examples, aspects of the operations of 1425 may be performed by a CLI Report Manager 735 as described with reference to FIG. 7.

Figure 15:
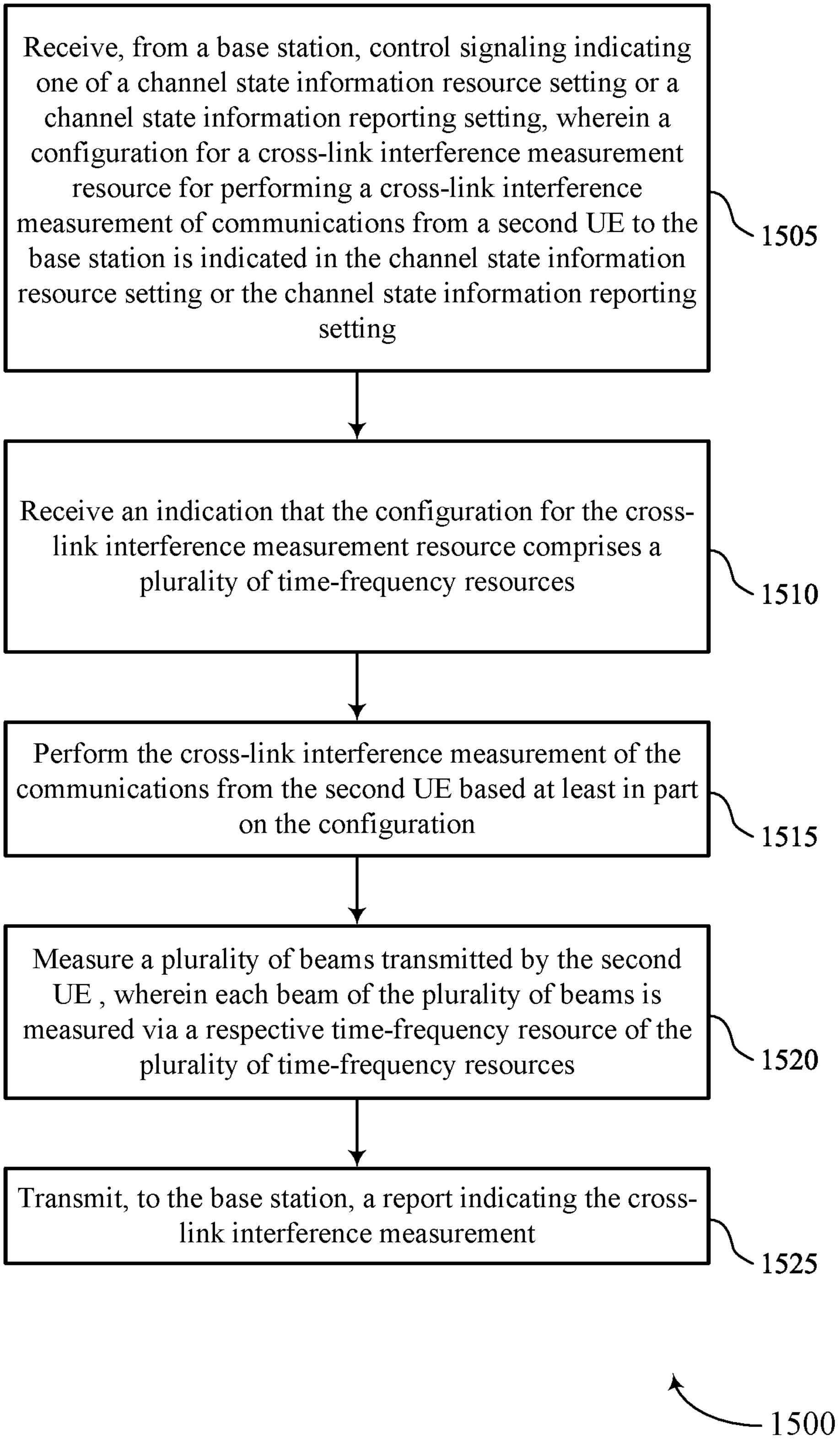

FIG. 15 shows a flowchart illustrating a method 1500 that supports channel state information enhancement with cross-link interference measurement in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting. The operations of 1505 may be performed in accordance with examples as disclosed herein. In some examples, aspects of the operations of 1505 may be performed by a CL-IMR Manager 725 as described with reference to FIG. 7.

At 1510, the method may include receiving an indication that the configuration for the cross-link interference measurement resource includes a set of multiple time-frequency resources. The operations of 1510 may be performed in accordance with examples as disclosed herein. In some examples, aspects of the operations of 1510 may be performed by a CL-IMR Manager 725 as described with reference to FIG. 7.

At 1515, the method may include performing the cross-link interference measurement of the communications from the second UE based on the configuration. The operations of 1515 may be performed in accordance with examples as disclosed herein. In some examples, aspects of the operations of 1515 may be performed by a CLI Measurement Manager 730 as described with reference to FIG. 7.

At 1520, the method may include measuring a set of multiple beams transmitted by the second UE, where each beam of the set of multiple beams is measured via a respective time-frequency resource of the set of multiple time-frequency resources. The operations of 1520 may be performed in accordance with examples as disclosed herein. In some examples, aspects of the operations of 1520 may be performed by a CLI Measurement Manager 730 as described with reference to FIG. 7.

At 1525, the method may include transmitting, to the base station, a report indicating the cross-link interference measurement. The operations of 1525 may be performed in accordance with examples as disclosed herein. In some examples, aspects of the operations of 1525 may be performed by a CLI Report Manager 735 as described with reference to FIG. 7.

Figure 16:
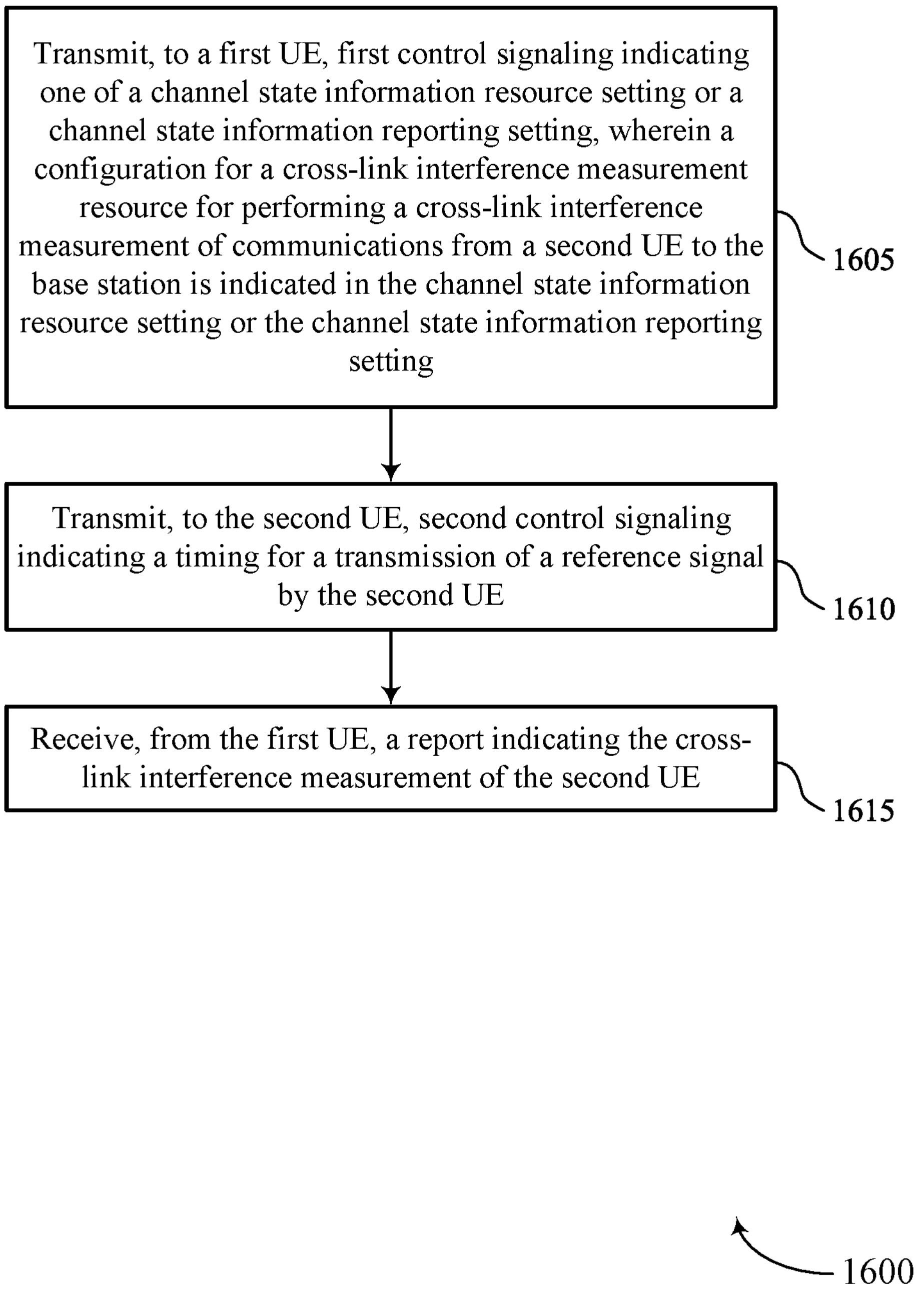

FIG. 16 shows a flowchart illustrating a method 1600 that supports channel state information enhancement with cross-link interference measurement in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a first UE, first control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting. The operations of 1605 may be performed in accordance with examples as disclosed herein. In some examples, aspects of the operations of 1605 may be performed by a CL-IMR Manager 1125 as described with reference to FIG. 11.

At 1610, the method may include transmitting, to the second UE, second control signaling indicating a timing for a transmission of a reference signal by the second UE. The operations of 1610 may be performed in accordance with examples as disclosed herein. In some examples, aspects of the operations of 1610 may be performed by a Reference Signal Manager 1130 as described with reference to FIG. 11.

At 1615, the method may include receiving, from the first UE, a report indicating the cross-link interference measurement of the second UE. The operations of 1615 may be performed in accordance with examples as disclosed herein. In some examples, aspects of the operations of 1615 may be performed by a CLI Report Manager 1135 as described with reference to FIG. 11.

Figure 17:
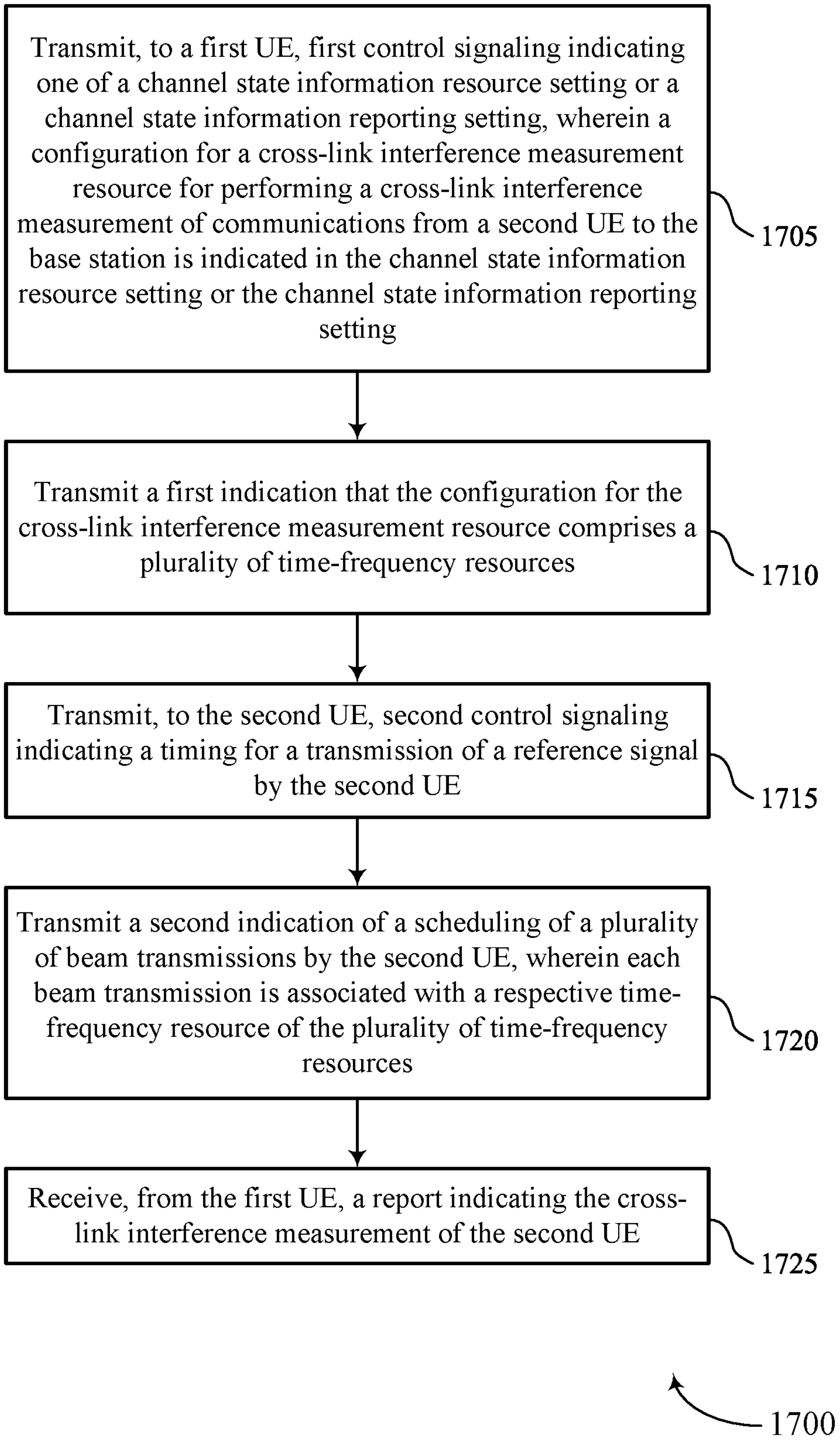

FIG. 17 shows a flowchart illustrating a method 1700 that supports channel state information enhancement with cross-link interference measurement in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to a first UE, first control signaling indicating one of a channel state information resource setting or a channel state information reporting setting, where a configuration for a cross-link interference measurement resource for performing a cross-link interference measurement of communications from a second UE to the base station is indicated in the channel state information resource setting or the channel state information reporting setting. The operations of 1705 may be performed in accordance with examples as disclosed herein. In some examples, aspects of the operations of 1705 may be performed by a CL-IMR Manager 1125 as described with reference to FIG. 11.

At 1710, the method may include transmitting a first indication that the configuration for the cross-link interference measurement resource includes a set of multiple time-frequency resources. The operations of 1710 may be performed in accordance with examples as disclosed herein. In some examples, aspects of the operations of 1710 may be performed by a CL-IMR Manager 1125 as described with reference to FIG. 11.

At 1715, the method may include transmitting, to the second UE, second control signaling indicating a timing for a transmission of a reference signal by the second UE. The operations of 1715 may be performed in accordance with examples as disclosed herein. In some examples, aspects of the operations of 1715 may be performed by a Reference Signal Manager 1130 as described with reference to FIG. 11.

At 1720, the method may include transmitting a second indication of a scheduling of a set of multiple beam transmissions by the second UE, where each beam transmission is associated with a respective time-frequency resource of the set of multiple time-frequency resources. The operations of 1720 may be performed in accordance with examples as disclosed herein. In some examples, aspects of the operations of 1720 may be performed by a Reference Signal Manager 1130 as described with reference to FIG. 11.

At 1725, the method may include receiving, from the first UE, a report indicating the cross-link interference measurement of the second UE. The operations of 1725 may be performed in accordance with examples as disclosed herein. In some examples, aspects of the operations of 1725 may be performed by a CLI Report Manager 1135 as described with reference to FIG. 11.

The following provides an overview of aspects of the present disclosure:

Aspect 1: A method for wireless communications at a first UE, comprising: receiving, from a base station, control signaling indicating one of a channel state information resource setting or a channel state information reporting setting, wherein a configuration for a cross-link interference measurement resource for performing a cross-link interference measurement of communications from a second UE to the base station is indicated in the channel state information resource setting or the channel state information reporting setting; performing the cross-link interference measurement of the communications from the second UE based at least in part on the configuration; and transmitting, to the base station, a report indicating the cross-link interference measurement.

Aspect 2: The method of aspect 1, wherein performing the cross-link interference measurement further comprises: receiving, from the second UE, a reference signal during the cross-link interference measurement resource; and measuring a signal strength of the reference signal.

Aspect 3: The method of any of aspects 1 through 2, wherein receiving the control signaling comprises: receiving an indication that the configuration for the cross-link interference measurement resource comprises a plurality of time-frequency resources, wherein performing the cross-link interference measurement of the second UE comprises: measuring a plurality of beams transmitted by the second UE, wherein each beam of the plurality of beams is measured via a respective time-frequency resource of the plurality of time-frequency resources.

Aspect 4: The method of any of aspects 1 through 3, wherein receiving the control signaling comprises: receiving an indication that the configuration for the cross-link interference measurement resource comprises a plurality of time-frequency resources, wherein performing the cross-link interference measurement of the second UE comprises: measuring a plurality of beams transmitted by a plurality of UEs, wherein the plurality of UEs comprises the second UE, and wherein each beam of the plurality of beams is measured via a respective time-frequency resource of the plurality of time-frequency resources.

Aspect 5: The method of any of aspects 1 through 4, wherein receiving the control signaling comprises: receiving an indication of a plurality of channel state information resources, wherein the configuration identifies the cross-link interference measurement resource from the plurality of channel state information resources.

Aspect 6: The method of any of aspects 1 through 5, wherein receiving the control signaling comprises: receiving an indication that the configuration for the cross-link interference measurement resource comprises a plurality of time-frequency resources, wherein each time-frequency resource of the plurality of time-frequency resources is one-to-one mapped with a respective channel measurement resource of a plurality of channel measurement resources.

Aspect 7: The method of aspect 6, wherein each time-frequency resource of the plurality of time-frequency resources is quasi co-located with the respective one-to-one mapped channel measurement resource of the plurality of channel measurement resources.

Aspect 8: The method of any of aspects 1 through 7, further comprising: calculating a channel state information of a link between the first UE and the base station based at least in part on the cross-link interference measurement of the second UE, wherein transmitting the report indicating the cross-link interference measurement comprises transmitting the calculated channel state information.

Aspect 9: The method of aspect 8, wherein calculating the channel state information comprises: calculating a layer one reference signal received power, a layer one signal to interference and noise ratio, a precoding matrix index, a rank indicator, a channel quality indicator, a layer one received signal strength indicator, or a combination thereof.

Aspect 10: The method of any of aspects 1 through 9, further comprising: receiving, from the base station, a downlink control information message indicating an aperiodic cross-link interference measurement and reporting using the configuration for the cross-link interference measurement resource.

Aspect 11: A method for wireless communications at a base station, comprising: transmitting, to a first UE, first control signaling indicating one of a channel state information resource setting or a channel state information reporting setting, wherein a configuration for a cross-link interference measurement resource for performing a cross-link interference measurement of communications from a second UE to the base station is indicated in the channel state information resource setting or the channel state information reporting setting; transmitting, to the second UE, second control signaling indicating a timing for a transmission of a reference signal by the second UE; and receiving, from the first UE, a report indicating the cross-link interference measurement of the second UE.

Aspect 12: The method of aspect 11, further comprising: transmitting, to the first UE and the second UE, a common downlink control information message to the first UE and the second UE indicating an aperiodic cross-link interference measurement and reporting using the configuration for the cross-link interference measurement resource, wherein the common downlink control information message comprises the second control signaling.

Aspect 13: The method of any of aspects 11 through 12, further comprising: transmitting, to the first UE, a downlink control information message indicating an aperiodic cross-link interference measurement and reporting using the configuration for the cross-link interference measurement resource.

Aspect 14: The method of any of aspects 11 through 13, wherein transmitting the first control signaling comprises: transmitting a first indication that the configuration for the cross-link interference measurement resource comprises a plurality of time-frequency resources, and wherein transmitting the second control signaling comprises: transmitting a second indication of a scheduling of a plurality of beam transmissions by the second UE, wherein each beam transmission is associated with a respective time-frequency resource of the plurality of time-frequency resources.

Aspect 15: The method of any of aspects 11 through 14, wherein transmitting the first control signaling comprises: transmitting a first indication that the configuration for the cross-link interference measurement resource comprises a plurality of time-frequency resources, and wherein transmitting the second control signaling comprises: transmitting, to a plurality of UEs, a second indication of a scheduling of a plurality of beam transmissions by the plurality of UEs, wherein the plurality of UEs comprises the second UE, and wherein each beam transmission is associated with a respective time-frequency resource of the plurality of time-frequency resources.

Aspect 16: The method of any of aspects 11 through 15, wherein transmitting the first control signaling comprises: transmitting an indication of a plurality of channel state information resources, wherein the configuration identifies the cross-link interference measurement resource from the plurality of channel state information resources.

Aspect 17: The method of any of aspects 11 through 16, wherein transmitting the first control signaling comprises: transmitting an indication that the configuration for the cross-link interference measurement resource comprises a plurality of time-frequency resources, wherein each time-frequency resource of the plurality of time-frequency resources is one-to-one mapped with a respective channel measurement resource of a plurality of channel measurement resources.

Aspect 18: The method of aspect 17, wherein each time-frequency resource of the plurality of time-frequency resources is quasi co-located with the respective one-to-one mapped channel measurement resource of the plurality of channel measurement resources.

Aspect 19: The method of any of aspects 11 through 18, wherein receiving the report indicating the cross-link interference measurement comprises: receiving an indication of a channel state information of a link between the first UE and the base station.

Aspect 20: An apparatus for wireless communications at a first UE, comprising a processor; memory coupled with the processor; and instructions stored in the memory and executable by the processor to cause the apparatus to perform a method of any of aspects 1 through 10.

Aspect 21: An apparatus for wireless communications at a first UE, comprising at least one means for performing a method of any of aspects 1 through 10.

Aspect 22: A non-transitory computer-readable medium storing code for wireless communications at a first UE, the code comprising instructions executable by a processor to perform a method of any of aspects 1 through 10.

Aspect 23: An apparatus for wireless communications at a base station, comprising a processor; memory coupled with the processor; and instructions stored in the memory and executable by the processor to cause the apparatus to perform a method of any of aspects 11 through 19.

Aspect 24: An apparatus for wireless communications at a base station, comprising at least one means for performing a method of any of aspects 11 through 19.

Aspect 25: A non-transitory computer-readable medium storing code for wireless communications at a base station, the code comprising instructions executable by a processor to perform a method of any of aspects 11 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising: receiving, from a network device, control signaling indicating one of a channel state information resource setting or a channel state information reporting setting, wherein a configuration for a cross-link interference measurement resource for performing a cross-link interference measurement of communications from a second UE to the network device is indicated in the channel state information resource setting or the channel state information reporting setting, wherein the configuration for the cross-link interference measurement resource comprises a plurality of time-frequency resources; receiving, from the network device, a downlink control information message that indicates an aperiodic cross-link interference measurement and reporting that uses the configuration for the cross-link interference measurement resource; performing, based at least in part on the downlink control information message, the cross-link interference measurement of the communications from the second UE based at least in part on the configuration, wherein performing the cross-link interference measurement comprises measuring a plurality of different transmit beams of the second UE, wherein each transmit beam of the plurality of different transmit beams is measured via a respective different time-frequency resource of the plurality of time-frequency resources; and transmitting, to the network device and based at least in part on the downlink control information message, a report indicating the cross-link interference measurement.

2. The method of claim 1, wherein performing the cross-link interference measurement further comprises: receiving, from the second UE, a reference signal during the cross-link interference measurement resource; and measuring a signal strength of the reference signal.

3. The method of claim 1, wherein performing the cross-link interference measurement of the second UE comprises: measuring a second plurality of different transmit beams of a plurality of UEs in addition to the second UE, wherein each beam of the second plurality of different transmit beams is measured via a second respective time-frequency resource of the plurality of time-frequency resources.

4. The method of claim 1, wherein receiving the control signaling comprises: receiving an indication of a plurality of channel state information resources, wherein the configuration identifies the cross-link interference measurement resource from the plurality of channel state information resources.

5. The method of claim 1, wherein each time-frequency resource of the plurality of time-frequency resources is one-to-one mapped with a respective channel measurement resource of a plurality of channel measurement resources.

6. The method of claim 5, wherein each time-frequency resource of the plurality of time-frequency resources is quasi co-located with the respective channel measurement resource of the plurality of channel measurement resources.

7. The method of claim 1, further comprising: calculating a channel state information of a link between the first UE and the network device based at least in part on the cross-link interference measurement of the second UE, wherein transmitting the report indicating the cross-link interference measurement comprises transmitting the calculated channel state information.

8. The method of claim 7, wherein calculating the channel state information comprises: calculating a layer one reference signal received power, a layer one signal to interference and noise ratio, a precoding matrix index, a rank indicator, a channel quality indicator, a layer one received signal strength indicator, or a combination thereof.

9. A method for wireless communications at a network device, comprising: transmitting, to a first UE, first control signaling indicating one of a channel state information resource setting or a channel state information reporting setting, wherein a configuration for a cross-link interference measurement resource for performing a cross-link interference measurement of communications from a second UE to the network device is indicated in the channel state information resource setting or the channel state information reporting setting; transmitting, to the second UE, second control signaling indicating a timing for a transmission of a reference signal by the second UE; and receiving, from the first UE, a report indicating the cross-link interference measurement of the second UE.

10. The method of claim 9, further comprising: transmitting, to the first UE and the second UE, a common downlink control information message indicating an aperiodic cross-link interference measurement and reporting using the configuration for the cross-link interference measurement resource, wherein the common downlink control information message comprises the second control signaling.

11. The method of claim 9, further comprising: transmitting, to the first UE, a downlink control information message indicating an aperiodic cross-link interference measurement and reporting using the configuration for the cross-link interference measurement resource.

12. The method of claim 9, wherein transmitting the first control signaling comprises: transmitting a first indication that the configuration for the cross-link interference measurement resource comprises a plurality of time-frequency resources, and wherein transmitting the second control signaling comprises: transmitting a second indication of a scheduling of a plurality of beam transmissions by the second UE, wherein each beam transmission is associated with a respective time-frequency resource of the plurality of time-frequency resources.

13. The method of claim 9, wherein transmitting the first control signaling comprises: transmitting a first indication that the configuration for the cross-link interference measurement resource comprises a plurality of time-frequency resources, and wherein transmitting the second control signaling comprises: transmitting, to a plurality of UEs, a second indication of a scheduling of a plurality of beam transmissions by the plurality of UEs, wherein the plurality of UEs comprises the second UE, and wherein each beam transmission is associated with a respective time-frequency resource of the plurality of time-frequency resources.

14. The method of claim 9, wherein transmitting the first control signaling comprises: transmitting an indication of a plurality of channel state information resources, wherein the configuration identifies the cross-link interference measurement resource from the plurality of channel state information resources.

15. The method of claim 9, wherein transmitting the first control signaling comprises: transmitting an indication that the configuration for the cross-link interference measurement resource comprises a plurality of time-frequency resources, wherein each time-frequency resource of the plurality of time-frequency resources is one-to-one mapped with a respective channel measurement resource of a plurality of channel measurement resources.

16. The method of claim 15, wherein each time-frequency resource of the plurality of time-frequency resources is quasi co-located with the respective channel measurement resource of the plurality of channel measurement resources.

17. The method of claim 9, wherein receiving the report indicating the cross-link interference measurement comprises: receiving an indication of a channel state information of a link between the first UE and the network device.

18. An apparatus for wireless communications at a first user equipment (UE), comprising: at least one processor; memory coupled with the at least one processor; and instructions stored in the memory and executable by the at least one processor to cause the apparatus to: receive, from a network device, control signaling indicating one of a channel state information resource setting or a channel state information reporting setting, wherein a configuration for a cross-link interference measurement resource for performing a cross-link interference measurement of communications from a second UE to the network device is indicated in the channel state information resource setting or the channel state information reporting setting, wherein the configuration for the cross-link interference measurement resource comprises a plurality of time-frequency resources; receive, from the network device, a downlink control information message that indicates an aperiodic cross-link interference measurement and reporting that uses the configuration for the cross-link interference measurement resource; perform, based at least in part on the downlink control information message, the cross-link interference measurement of the communications from the second UE based at least in part on the configuration, wherein the instructions to perform the cross-link interference measurement of the second UE are further executable by the at least one processor to cause the apparatus to measure a plurality of different transmit beams of the second UE, wherein each transmit beam of the plurality of different transmit beams is measured via a respective different time-frequency resource of the plurality of time-frequency resources; and transmit, to the network device and based at least in part on the downlink control information message, a report indicating the cross-link interference measurement.

19. The apparatus of claim 18, wherein the instructions to perform the cross-link interference measurement are further executable by the at least one processor to cause the apparatus to: receive, from the second UE, a reference signal during the cross-link interference measurement resource; and measure a signal strength of the reference signal.

20. The apparatus of claim 18, wherein the instructions to perform the cross-link interference measurement of the second UE are further executable by the at least one processor to cause the apparatus to: measure a second plurality of different transmit beams of a plurality of UEs, wherein the plurality of UEs in addition to the second UE wherein each beam of the second plurality of different transmit beams is measured via a second respective time-frequency resource of the plurality of time-frequency resources.

21. The apparatus of claim 18, wherein the instructions to receive the control signaling are executable by the at least one processor to cause the apparatus to: receive an indication of a plurality of channel state information resources, wherein the configuration identifies the cross-link interference measurement resource from the plurality of channel state information resources.

22. The apparatus of claim 18, wherein each time-frequency resource of the plurality of time-frequency resources is one-to-one mapped with a respective channel measurement resource of a plurality of channel measurement resources.

23. The apparatus of claim 22, wherein each time-frequency resource of the plurality of time-frequency resources is quasi co-located with the respective channel measurement resource of the plurality of channel measurement resources.

24. The apparatus of claim 18, wherein the instructions are further executable by the at least one processor to cause the apparatus to: calculate a channel state information of a link between the first UE and the network device based at least in part on the cross-link interference measurement of the second UE, wherein transmitting the report indicating the cross-link interference measurement comprises transmitting the calculated channel state information.

25. The apparatus of claim 24, wherein the instructions to calculate the channel state information are executable by the at least one processor to cause the apparatus to: calculate a layer one reference signal received power, a layer one signal to interference and noise ratio, a precoding matrix index, a rank indicator, a channel quality indicator, a layer one received signal strength indicator, or a combination thereof.

26. An apparatus for wireless communications at a network device, comprising: at least one processor; memory coupled with the at least one processor; and instructions stored in the memory and executable by the at least one processor to cause the apparatus to: transmit, to a first UE, first control signaling indicating one of a channel state information resource setting or a channel state information reporting setting, wherein a configuration for a cross-link interference measurement resource for performing a cross-link interference measurement of communications from a second UE to the network device is indicated in the channel state information resource setting or the channel state information reporting setting; transmit, to the second UE, second control signaling indicating a timing for a transmission of a reference signal by the second UE; and receive, from the first UE, a report indicating the cross-link interference measurement of the second UE.

27. The method of claim 1, wherein the downlink control information message is a common downlink control information message that indicates a timing for transmission of one or more reference signals by the second UE.

28. The method of claim 27, wherein the one or more reference signals correspond to the plurality of different transmit beams.

29. The apparatus of claim 18, wherein the downlink control information message is a common downlink control information message that indicates a timing for transmission of one or more reference signals by the second UE.

30. The apparatus of claim 29, wherein the one or more reference signals correspond to the plurality of different transmit beams.

* * * * *